United States Patent [19]

Kajita et al.

[11] Patent Number: 4,465,272
[45] Date of Patent: Aug. 14, 1984

[54] ELECTROSTATIC COPYING APPARATUS

[75] Inventors: Hiroshi Kajita, Kobe; Masahide Iseki, Neyagawa; Tadanobu Nakajima, Sakurai; Yoshizo Kawamori, Fujiidera, all of Japan

[73] Assignee: Mita Industrial Co., Ltd., Japan

[21] Appl. No.: 361,238

[22] Filed: Mar. 24, 1982

[30] Foreign Application Priority Data

Mar. 31, 1981 [JP] Japan .................. 56-47874
Mar. 31, 1981 [JP] Japan .................. 56-47875

[51] Int. Cl.³ .................. B65H 5/06; B65H 9/06; B65H 29/14
[52] U.S. Cl. .................. 271/246; 271/245; 271/224; 271/258; 271/259; 271/265; 271/274; 271/314
[58] Field of Search .................. 271/245, 246, 275, 4, 271/3.1, 10, 265, 258, 259, 314, 274, 223, 224, DIG. 3

[56] References Cited

U.S. PATENT DOCUMENTS

| | | | |
|---|---|---|---|
| 3,046,010 | 7/1962 | Schneider | 271/88 |
| 4,023,791 | 5/1977 | Hori et al. | 271/3 |
| 4,146,326 | 3/1979 | Taylor et al. | 355/3 SH |
| 4,147,339 | 4/1979 | Shiina | 271/7 |
| 4,249,080 | 2/1981 | Pritchett et al. | 250/557 |
| 4,281,919 | 8/1981 | Nomura et al. | 355/50 |
| 4,332,462 | 6/1982 | Yagasaki et al. | 355/14 R |

FOREIGN PATENT DOCUMENTS 2815174 10/1978 Fed. Rep. of Germany ...... 271/245

*Primary Examiner*—Bruce H. Stoner, Jr.
*Assistant Examiner*—James E. Barlow
*Attorney, Agent, or Firm*—Beveridge, DeGrandi & Kline

[57] ABSTRACT

An electrostatic copying apparatus having a document holding device and a semi-automatic document feeding and discharging device provided on the top of a housing. The semi-automatic document feeding and discharging device includes a main frame structure mounted for free turning between an operating position and a non-operating position. When the main frame structure is held at the operating position, a document conveying passage having an introducing section, a main section and a curved discharging section is defined. The semi-automatic document feeding and discharging device further comprises a document conveying mechanism for conveying a document to be copied through the document conveying passage, a first regulating member located in the introducing section for regulating the position of the document, a second regulating member located near the downstream end of the main section for regulating the position of the document, and a control means for the document conveying mechanism and the first and second document-position regulating members. The document holding device comprises a document holding member and a mounting mechanism therefor. The mounting mechanism includes a support member mounted for free oscillation and upward and downward movement, and the document holding member is pivotally mounted on the support member.

23 Claims, 20 Drawing Figures

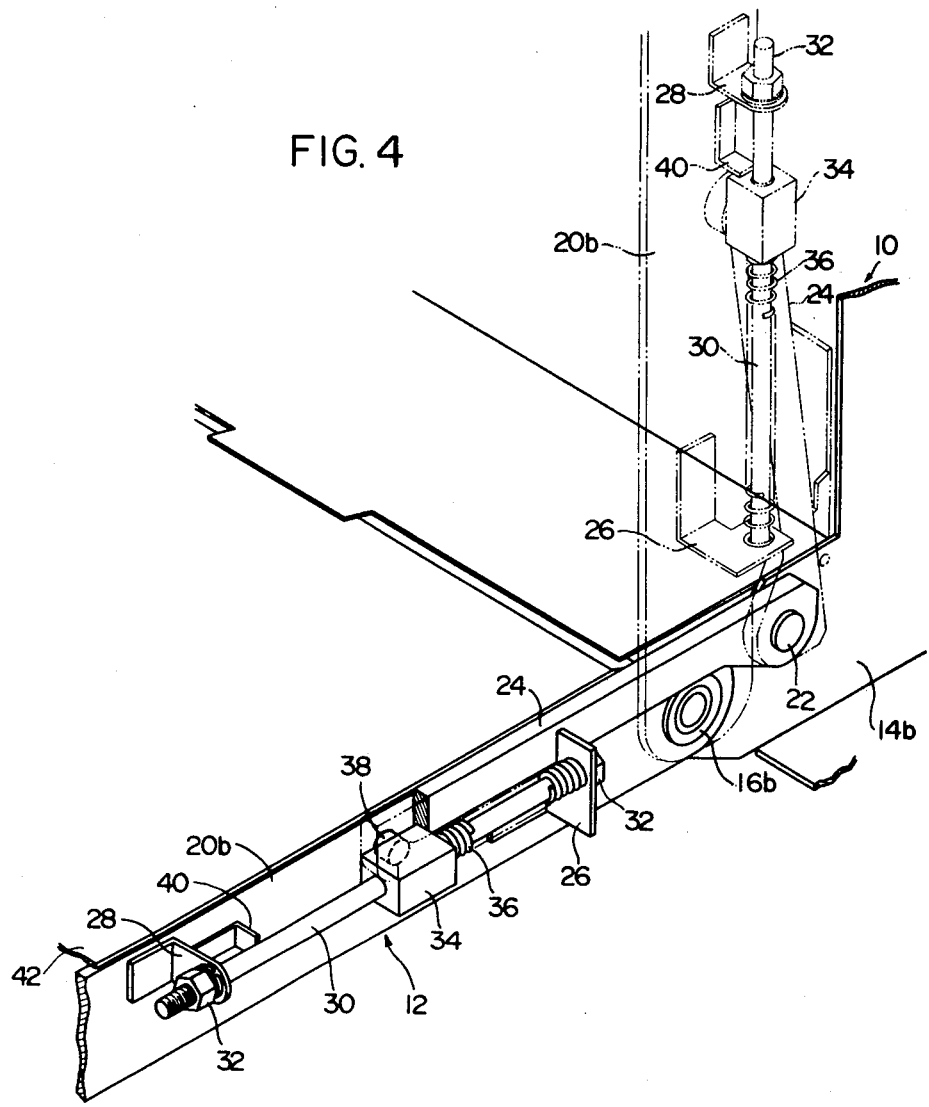

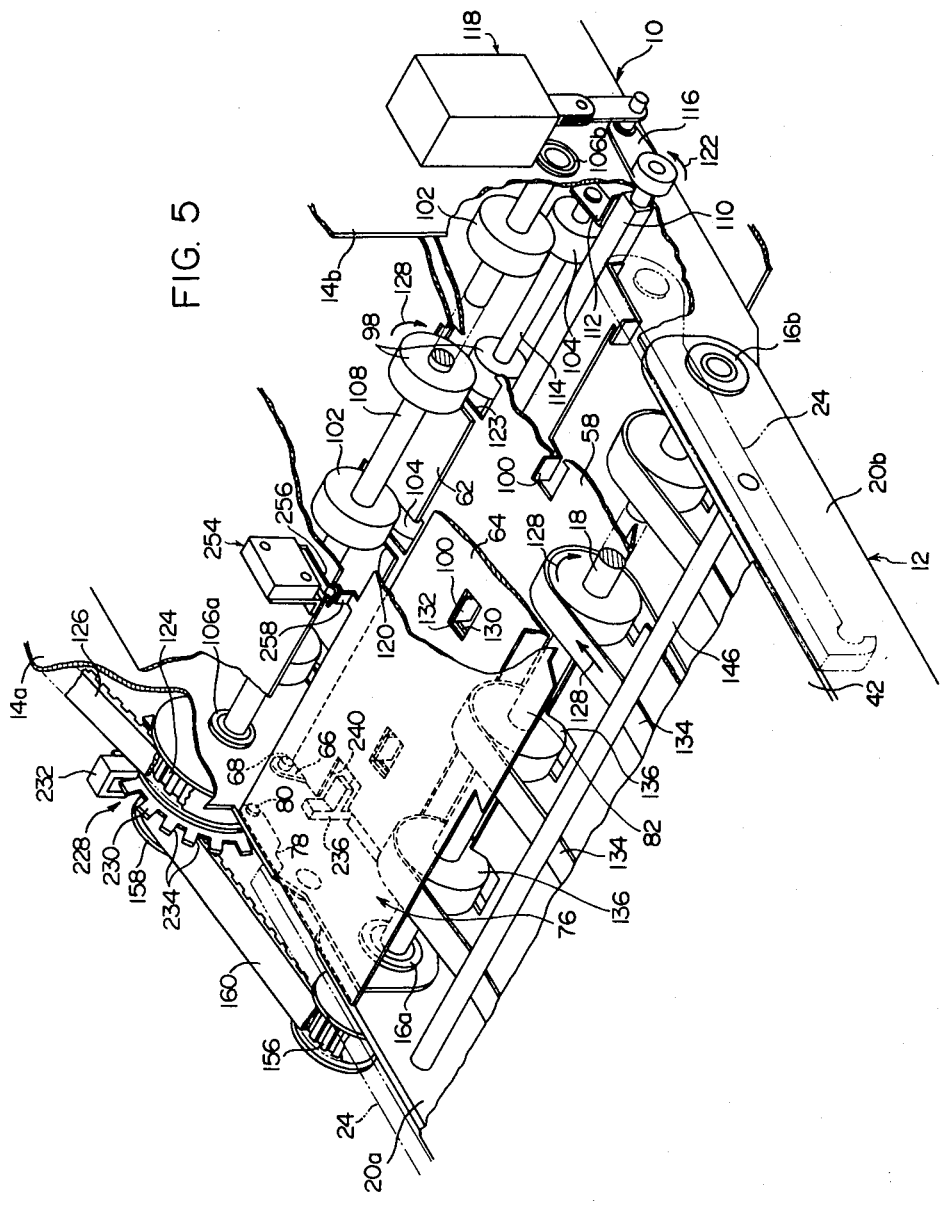

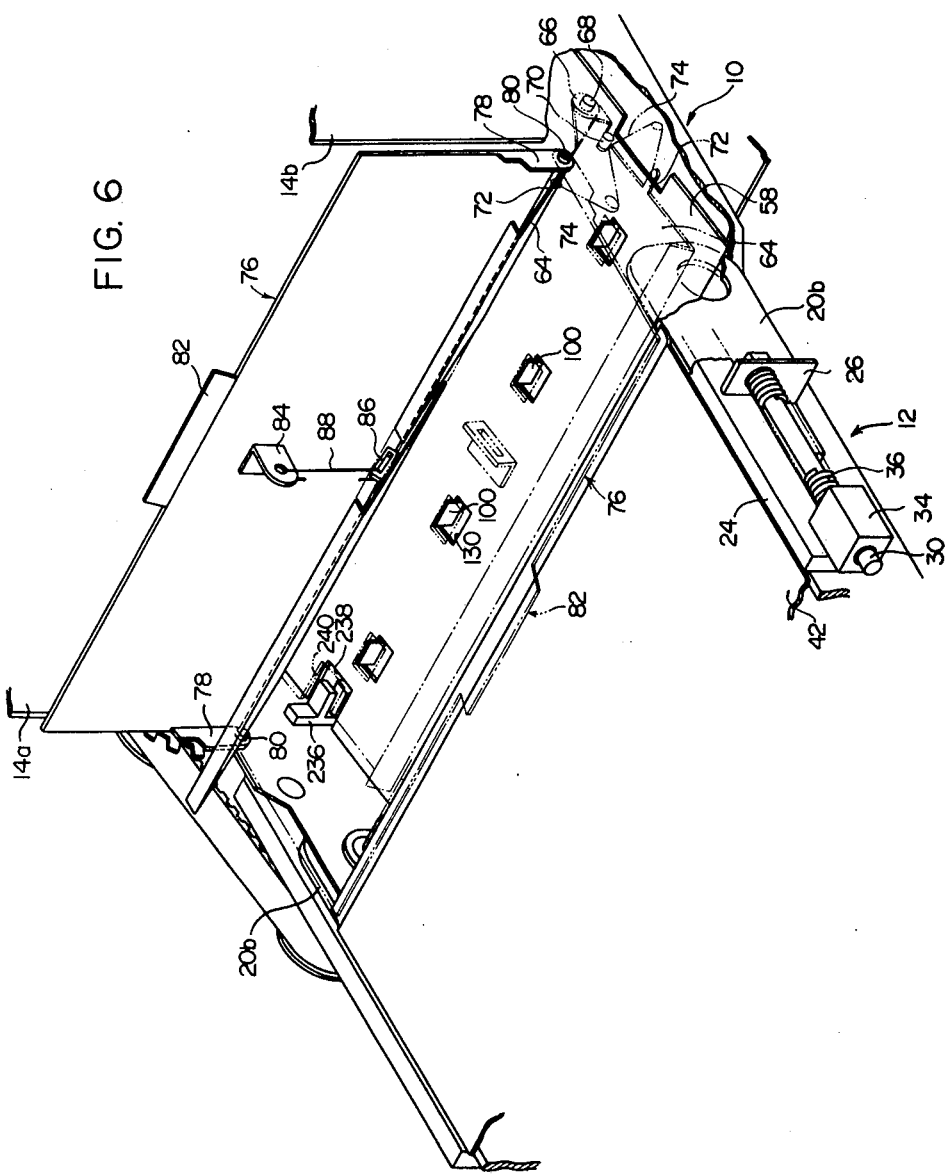

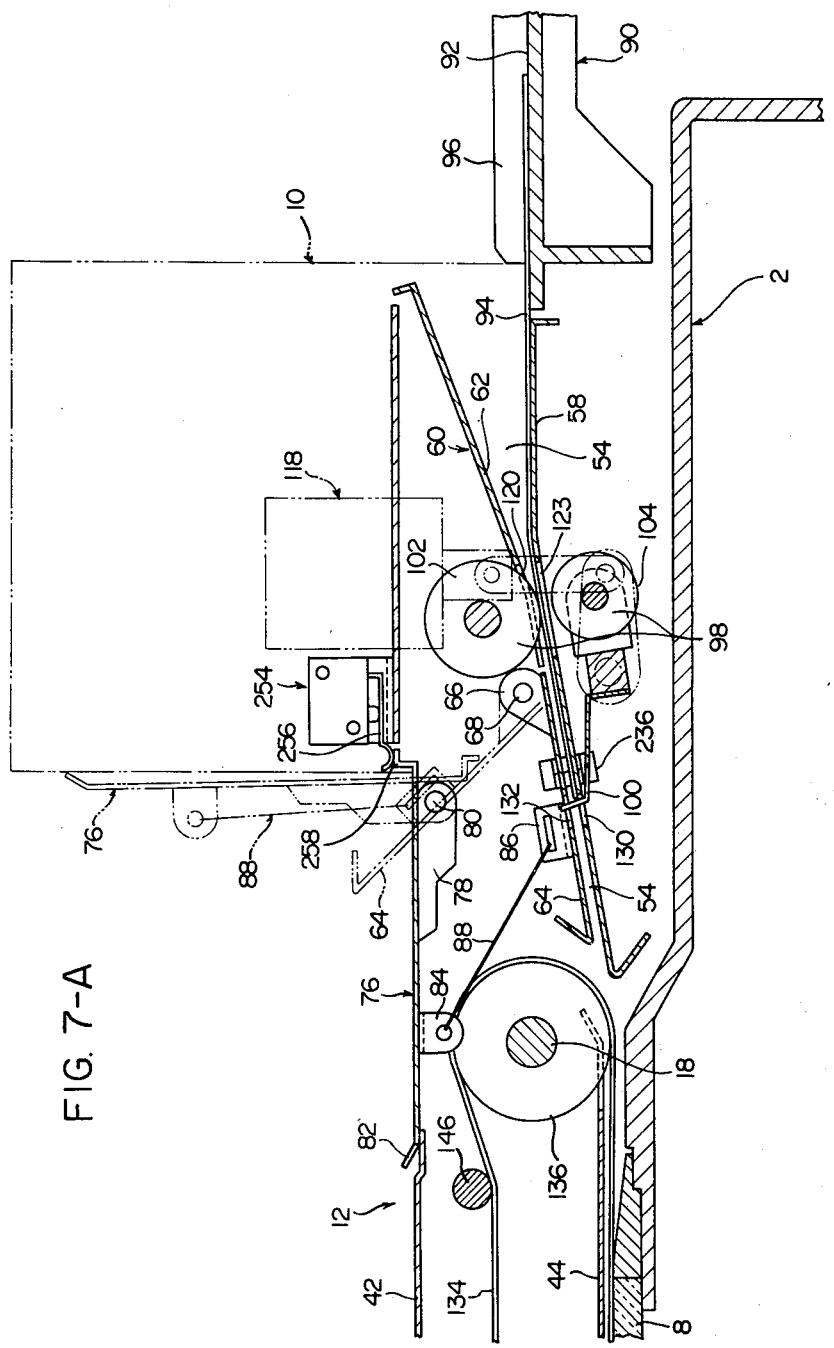

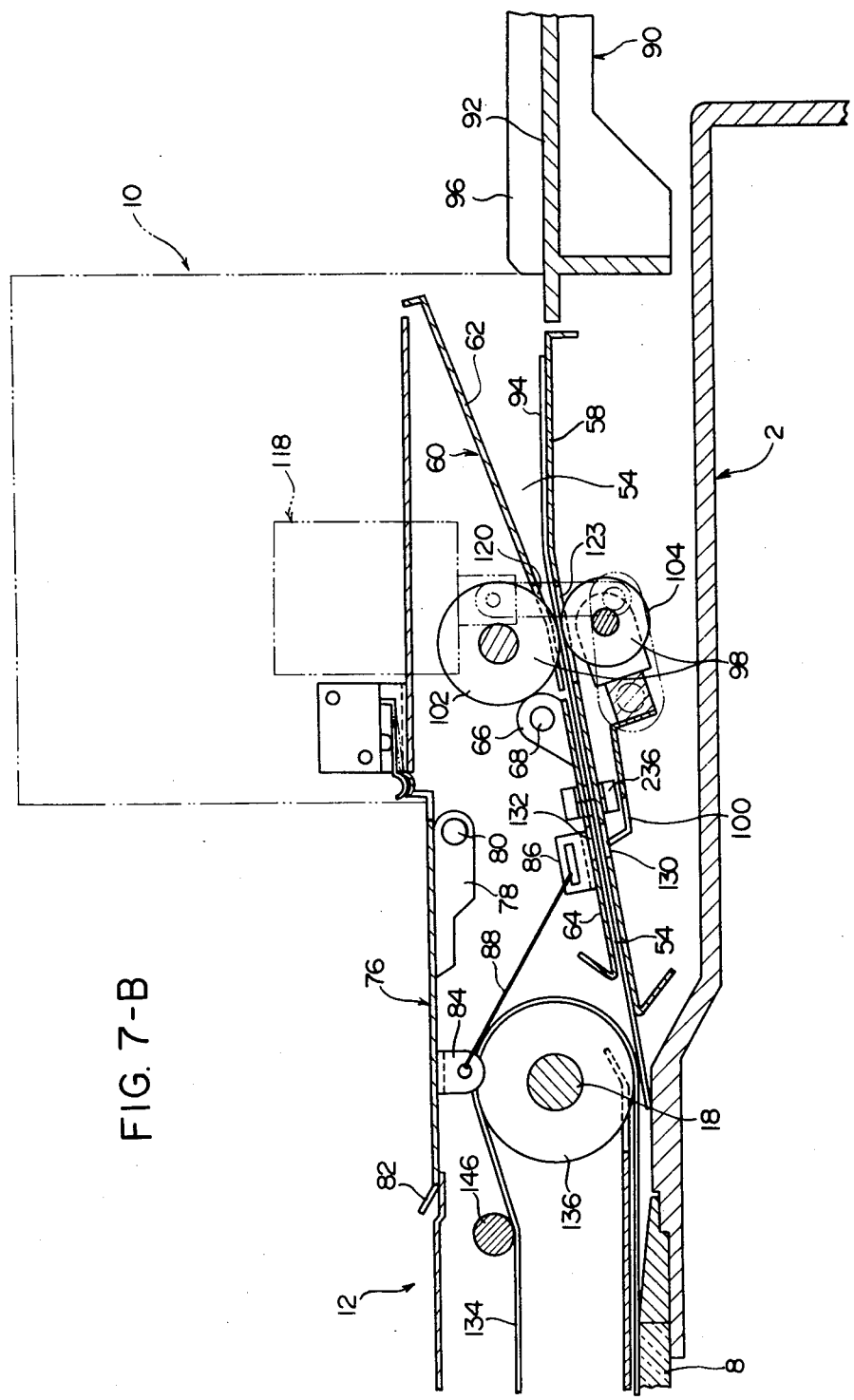

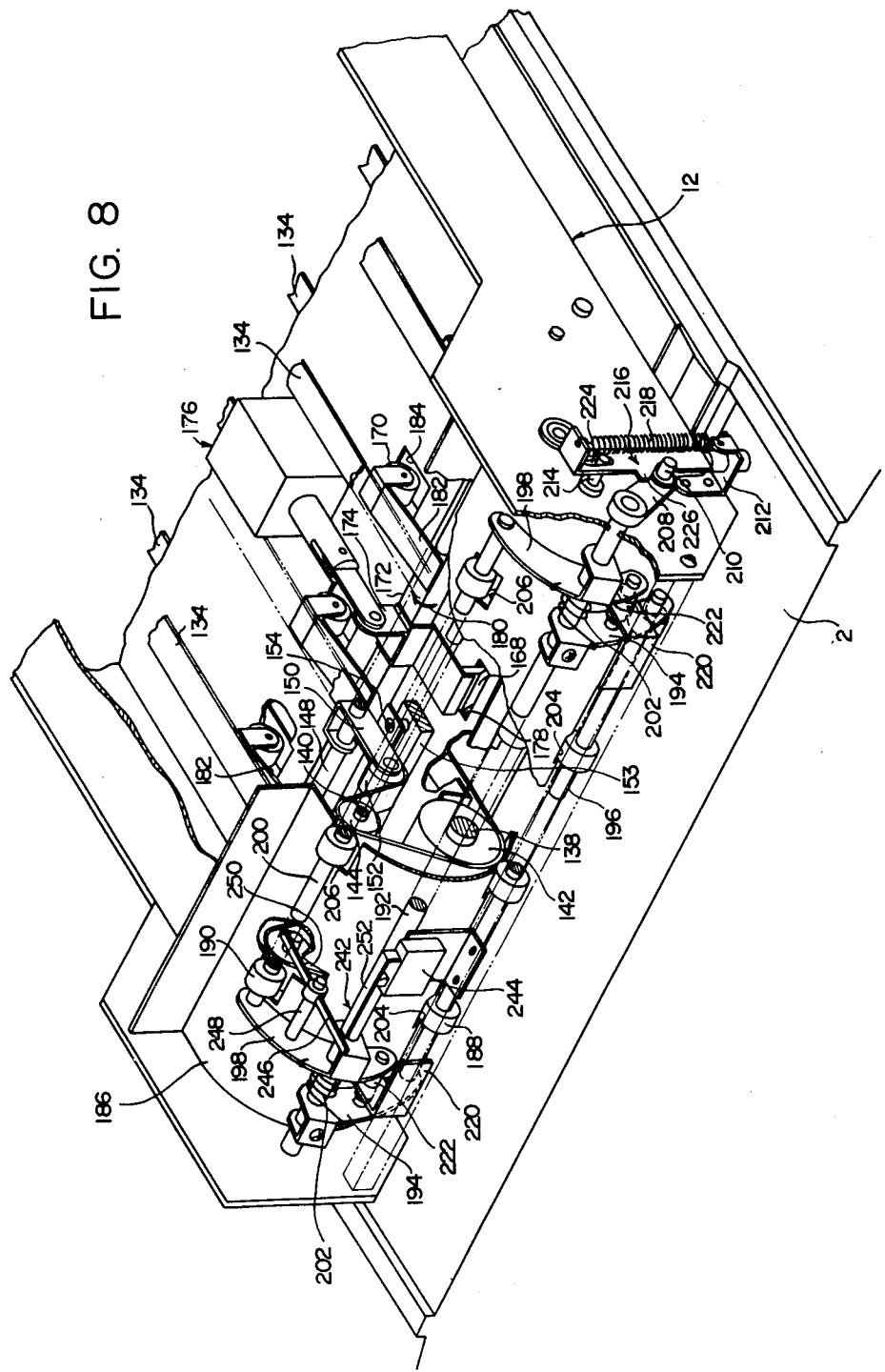

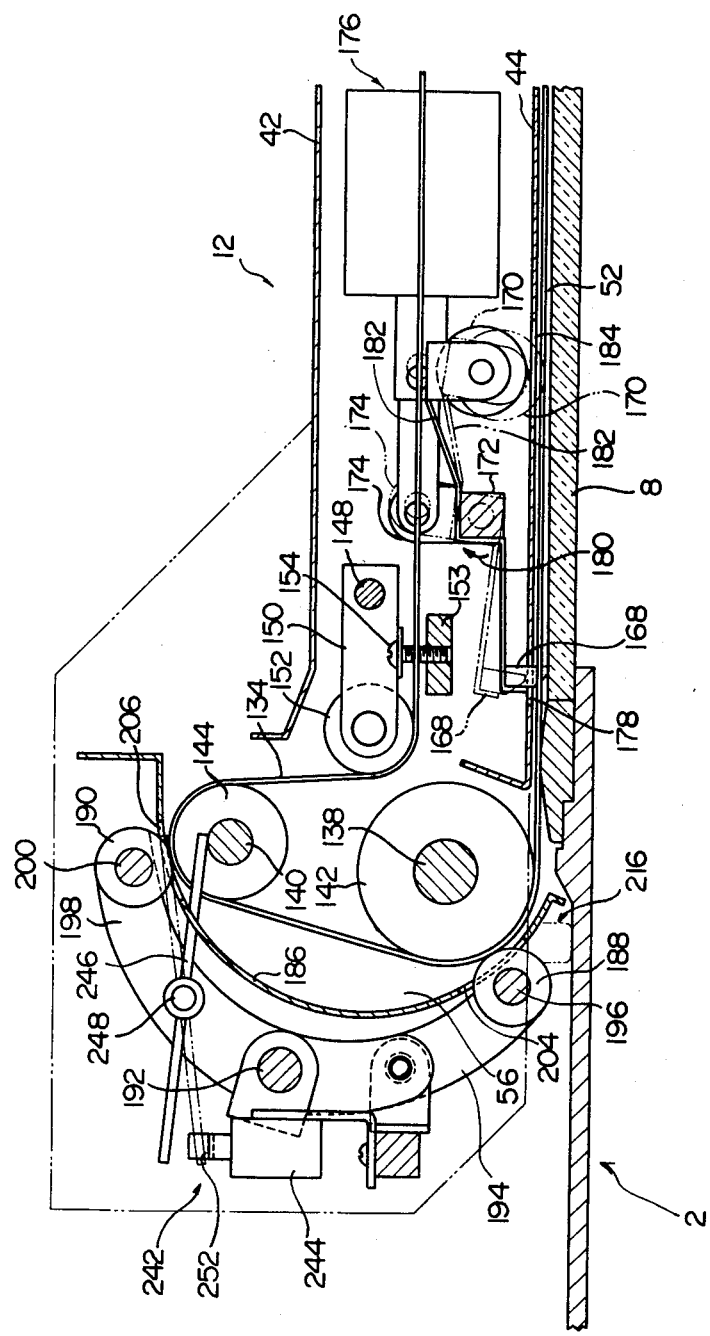
FIG. 10-A

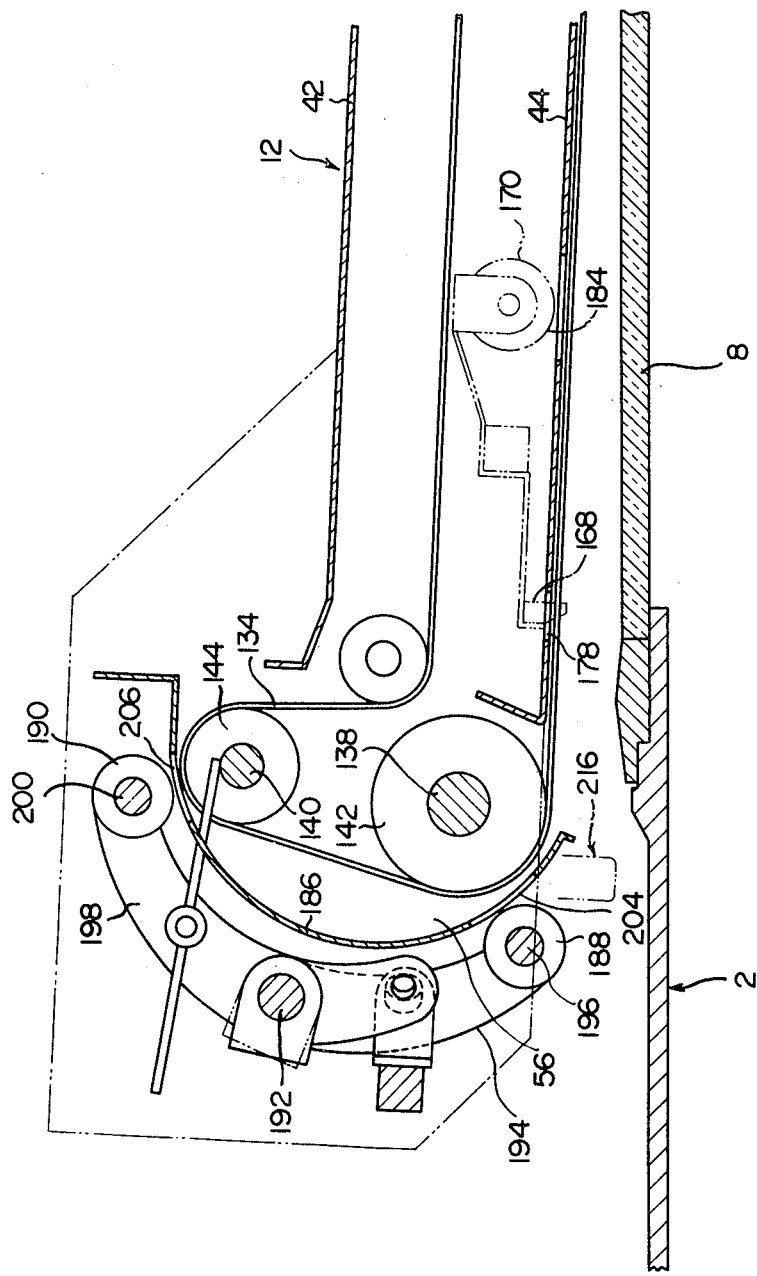

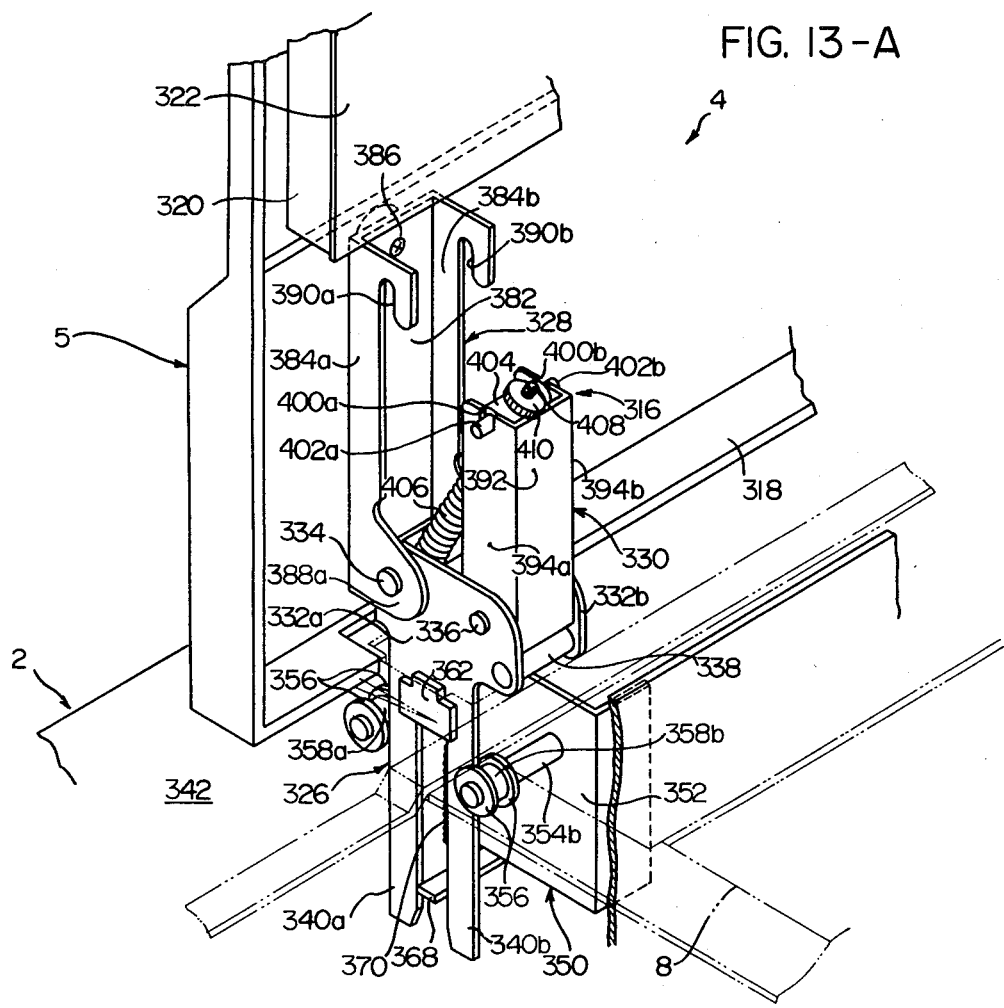
FIG. 13-A

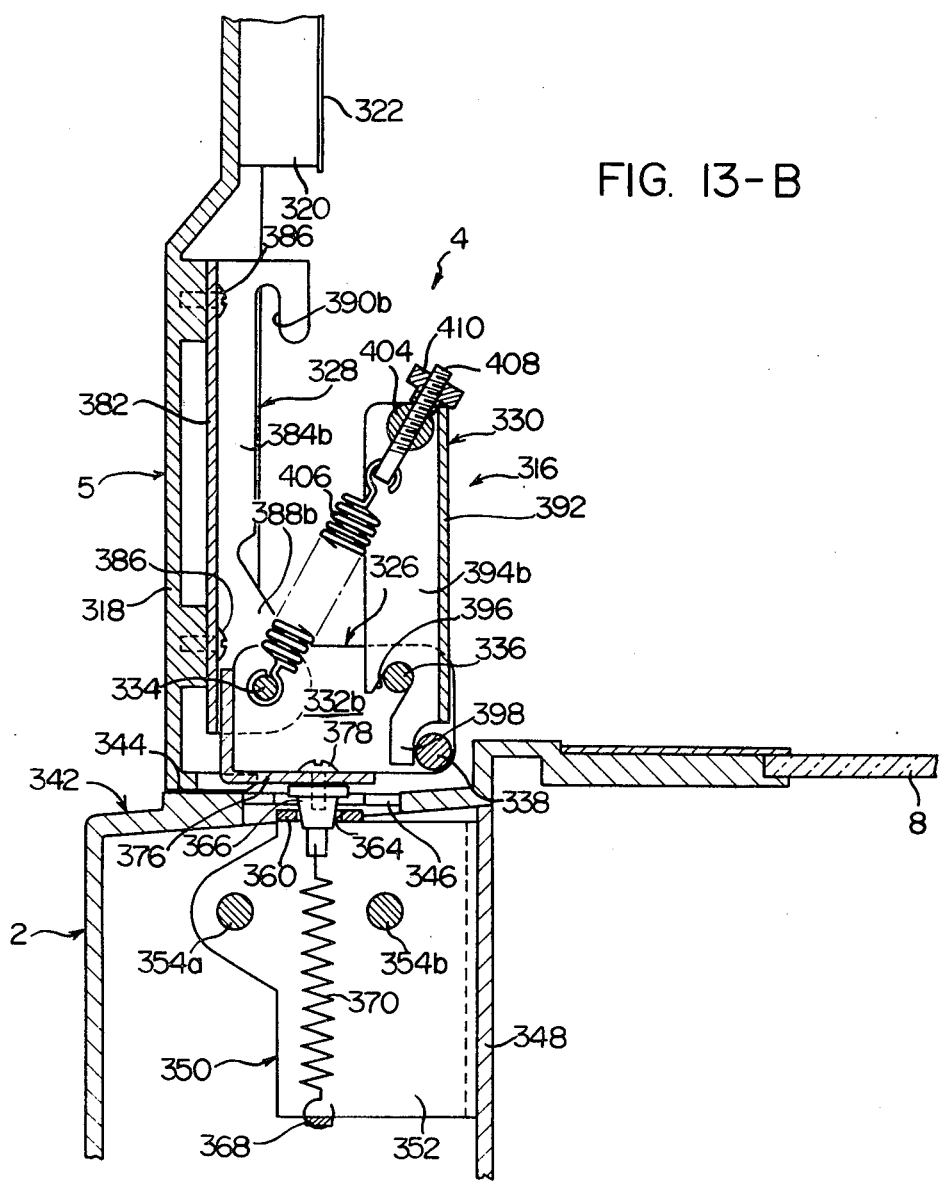
FIG. 13-B

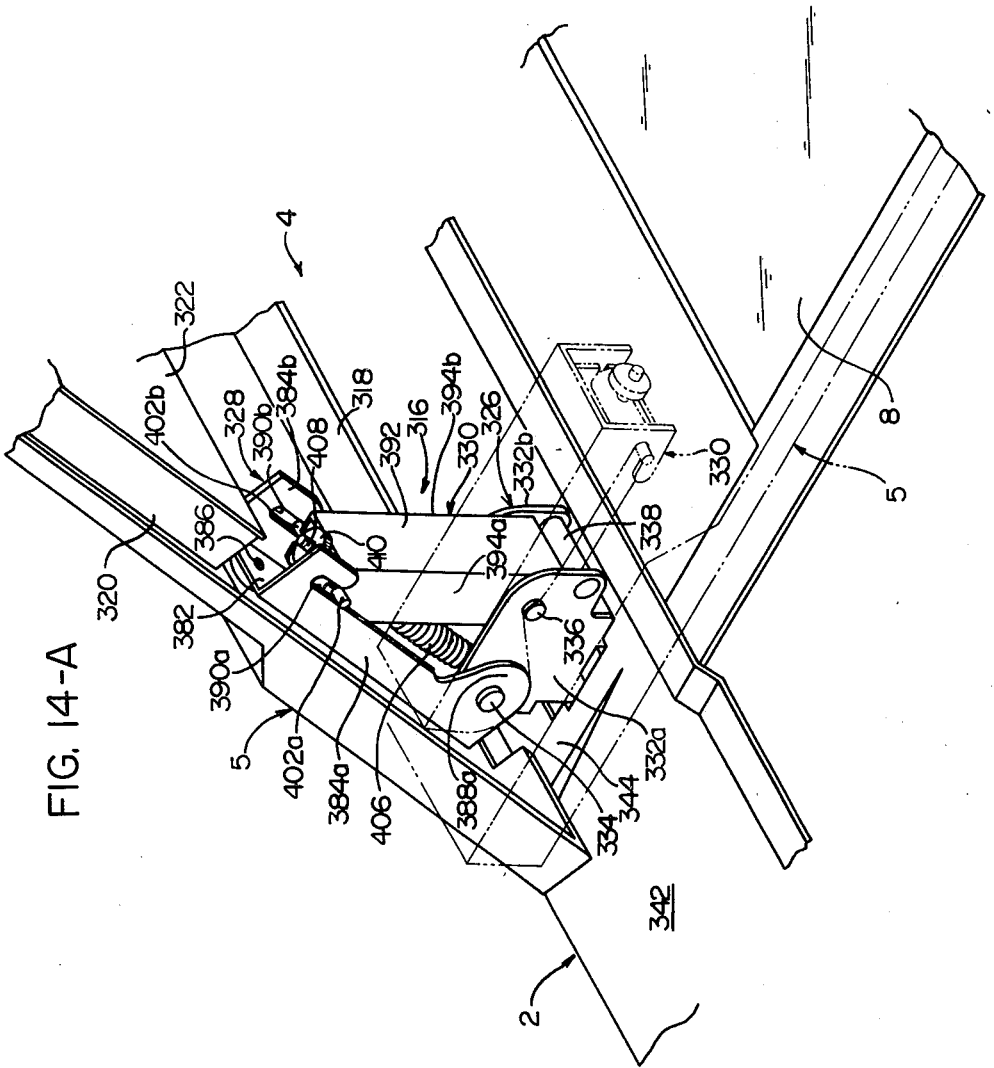
FIG. 14-A

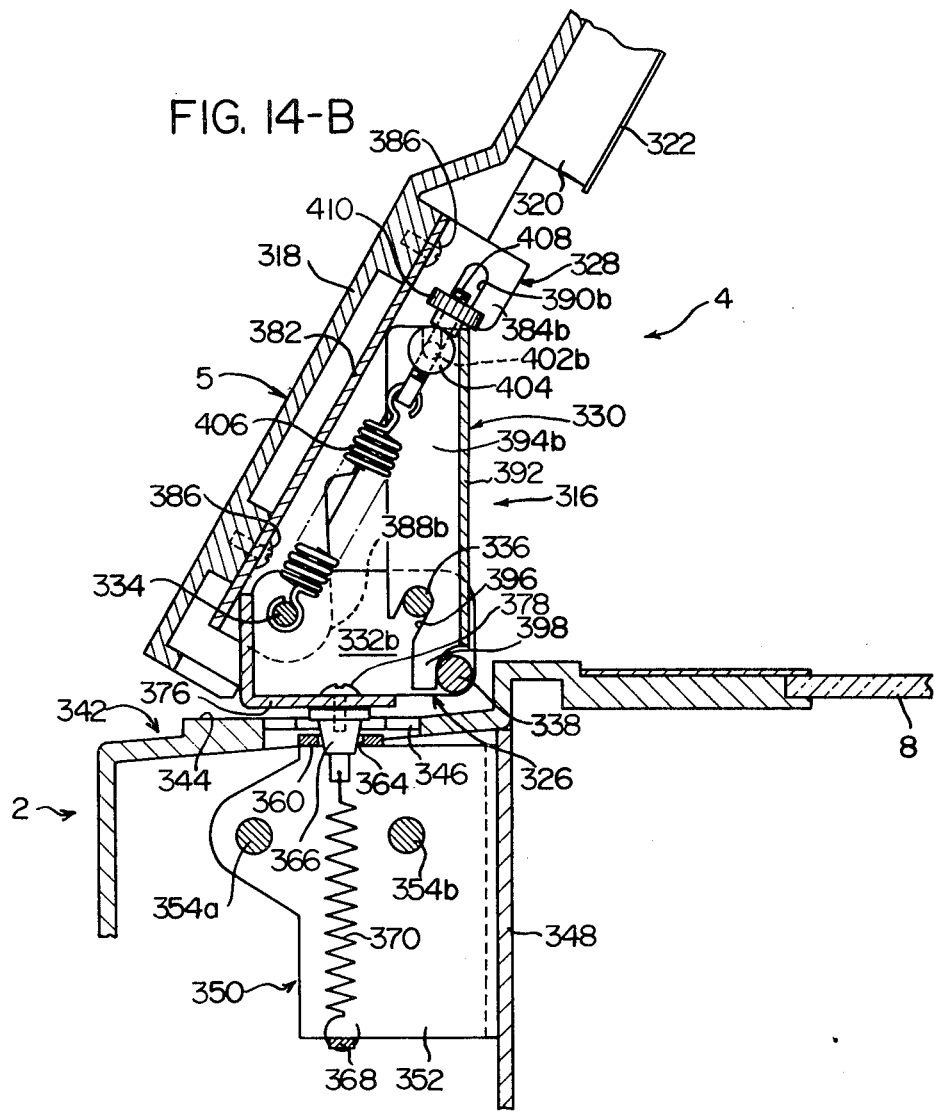

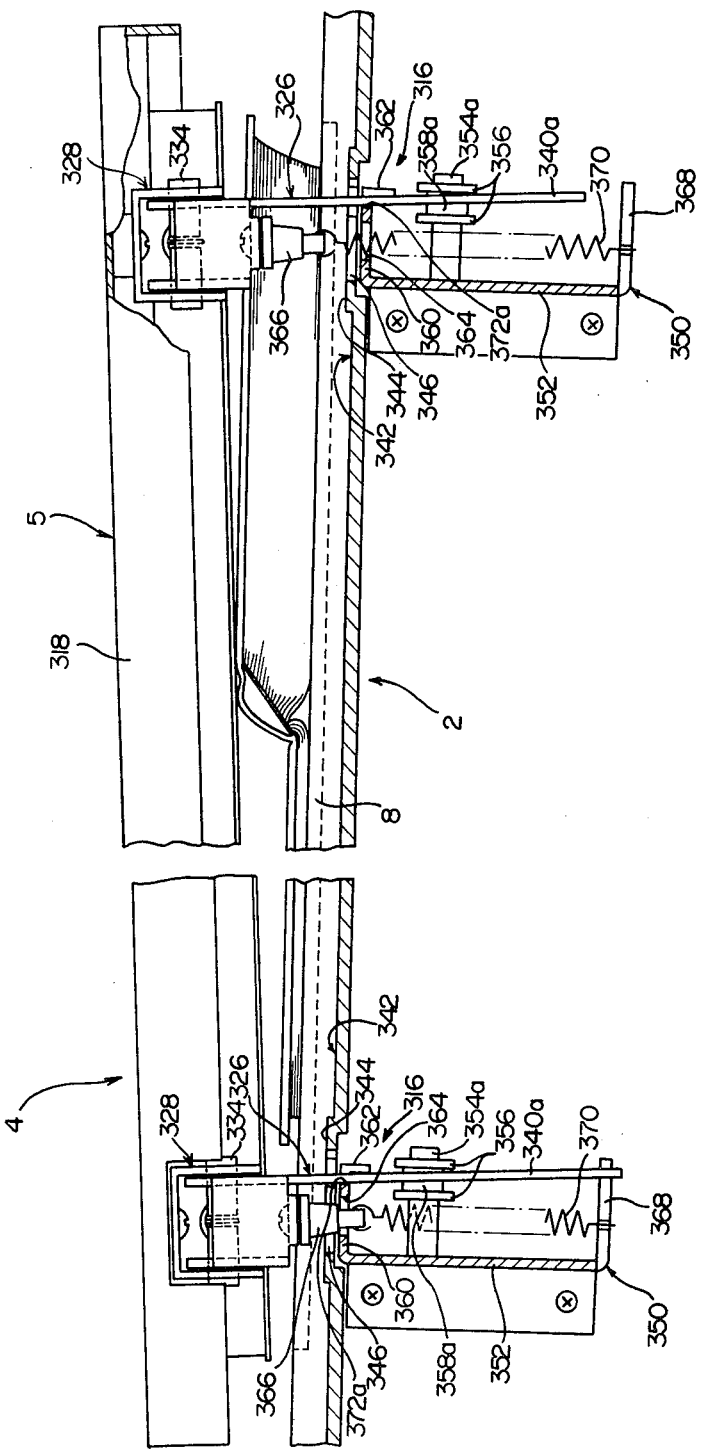

ELECTROSTATIC COPYING APPARATUS

FIELD OF THE INVENTION

This invention relates to an electrostatic copying apparatus. More specifically, it pertains to a device for semi-automatically feeding and discharging a document and a device for holding a document, which are provided in an electrostatic copying apparatus.

DESCRIPTION OF THE PRIOR ART

In an electrostatic copying apparatus, a transparent plate on which to place a document to be copied is generally disposed on the top of a housing of the copying apparatus. In relation to the transparent plate, there is provided a document holding device including a document holding member which can be manually turned between its closed position at which to cover the transparent plate and its open position at which to bring the transparent plate to view. In performing a copying operation, it is the usual practice, prior to the performance of a copying cycle by the electrostatic copying apparatus itself, to position a document on the transparent plate, then bring the document holding member to its closed position to cover the transparent plate and the document placed thereon, and following the performance of the copying cycle by the electrostatic copying apparatus itself, to bring the document holding member back to its open position and then to remove the document from the transparent plate.

The above manual operation which must be carried out with regard to document to be copied is considerably troublesome to the operator. In particular, when a number of documents are to be successively copied, the operator must repeat the above manual operation a number of times. Thus, the amount of the operator's work is considerably large, and the time required for the repetition of the manual operation considerably increases. Consequently, a long period of time is required to perform the desired copying operation.

In view of the foregoing situation, there has recently been suggested and used an electrostatic copying apparatus of the type equipped with a semi-automatic device for feeding and discharging a document in relation to the transparent plate in addition to the aforesaid document holding device. This semi-automatic document feeding and discharging device is disposed on the top of the housing of the copying apparatus in a certain specified relation to the transparent plate, and is adapted to feed a document placed at a predetermined position to the desired position on the transparent plate without the need for the manual opening, closing or turning of such a member as a document holding member, thereby establishing the required condition ready for the starting of a copying cycle by the copying apparatus itself. After the copying cycle has been performed by the copying apparatus itself, this semi-automatic device automatically discharges the document on the transparent plate onto a predetermined position.

The known semi-automatic document feeding and discharging device, however, presents various problems to be solved. For example, the device cannot permit the sure and accurate positioning of the document on the transparent plate. When jamming of the document occurs during its automatic feeding, a complex operation is required to get rid of it. In addition, the device is complex in structure and relatively costly to build.

On the other hand, the known document holding device itself to be provided in an electrostatic copying apparatus also presents the following problem to be solved. Generally, the document holding device is comprised of a document holding member for covering a transparent plate disposed on the top of the housing of the copying apparatus and a document placed thereon and pressing the document against the transparent plate and a mounting mechanism for mounting the document holding member on a supporting base portion located adjacent to one side edge of the transparent plate in such a manner that the document holding member is free to pivot about a pivot axis extending along the aforesaid one side edge of the transparent plate. In the known document holding device, the movement of the document holding member mounted on the supporting base portion by the mounting mechanism is limited to a pivotal movement about the aforesaid pivot axis or to both this pivotal movement and an up-and-down movement. Accordingly, when the document is a relatively thick one such as a book, particularly with considerable variations in thickness in the direction of the pivot axis, the document holding member cannot well cover the transparent plate and the document placed thereon and cannot well press the document against the transparent plate. This problem still requires a solution.

SUMMARY OF THE INVENTION

It is a first object of this invention therefore to provide, for installation in an electrostatic copying apparatus, a novel and excellent device for semi-automatically feeding and discharging a document to be copied, which ingeniously solves the aforesaid problems of the known semi-automatic document feeding and discharging device.

A second object of this invention is to provide a novel and excellent document holding device for an electrostatic copying apparatus, in which a document holding member mounted on a supporting base portion by a mounting mechanism not only can turn about the pivot axis and move upwardly and downwardly, but also can make a tilting movement as viewed in a direction at right angles to the pivot axis, and therefore, even when the document is relatively thick with considerable variations in thickness in the direction of the pivot axis, can well cover the transparent plate and the document placed thereon and press the document well against the transparent plate.

According to this invention, there is provided, for installation in an electrostatic copying apparatus of the type including a transparent plate on the top of a housing for placing thereon a document to be copied, a device for semi-automatically feeding and discharging the document to be copied, said device comprising a main frame structure mounting for free turning about an axis extending along one side edge of the transparent plate and between its operating position at which to cover the transparent plate and its non-operating position at which to bring the transparent plate to view, a document conveying passage having a main section which is defined between the under side of the main frame structure and the transparent plate when the main frame structure is at the operating position, an introducing section located upstream of the main section, and a curved discharging section connected to a document receiving surface defined on the top of the main frame structure, a mechanism for conveying the document through the conveying passage, a first regulating member for regulating the position of the document, said first regulating member being adapted to be selectively held either at an arresting position at which it projects into the introducing section of the document conveying passage to arrest the advancing of the document or at a non-arresting position at which it recedes from said introducing section and permits the advancing of the document, a second regulating member for regulating the position of the document, said second regulating member being adapted to be selectively held either at an arresting position at which it projects into that part of said main section of the document conveying passage which is near its downstream end or at a non-arresting position at which it recedes from said part of said main section and permits the advancing of the document, and control means for controlling the operation of the document conveying mechanism and the positioning of the first and second regulating members.

According to this invention, there is also provided a document holding device for an electrostatic copying apparatus, said holding device comprising a holding member for holding a document to be copied and a mounting mechanism for mounting the document holding member on a supporting base portion for free turning about a pivot axis extending along one side edge of a transparent plate on which to place the document, said supporting base portion being located adjacent to said one side edge of the transparent plate; characterized in that the mounting mechanism includes a support member mounted on said supporting base portion such that it is free to move upwardly and downwardly and to swing in the direction of said pivot axis, and the document holding member is mounted on said support member for free turning about said pivot axis.

BRIEF DESCRIPTION OF THE DRAWINGS

FIGS. 4 to 6 are partial perspective views showing the semi-automatic document feeding and discharging device in part;

FIG. 7-A is a partial sectional view showing a part of the semi-automatic document feeding and discharging device shown in FIG. 1;

FIG. 7-B is a partial sectional view, similar to FIG. 7-A, showing the state in which the feeding of a document has been started;

FIG. 8 is a partial perspective view showing a part of the semi-automatic document feeding and discharging device shown in FIG. 1;

FIG. 10-A is a partial sectional view showing a part of the semi-automatic document feeding and discharging device shown in FIG. 1;

FIG. 10-B is a partial sectional view, similar to FIG. 10-A, showing the state in which the main frame structure has been slightly lifted from the operating position;

FIGS. 13-A and 13-B are a partial perspective view and a sectional view showing the mounting mechanism of the document holding device shown in FIG. 1, and its related parts, in the state in which the document holding member is at its completely opened position;

FIGS. 14-A and 14-B are a partial perspective view and a sectional view showing the mounting mechanism of the document holding device shown in FIG. 1, and its related parts, in the state in which the document holding member is at its half-opened position;

FIG. 16 is a sectional view for illustrating the operation of the document holding device shown in FIG. 1.

DETAILED DESCRIPTION OF THE PREFERRED EMBODIMENTS

Figure 1:
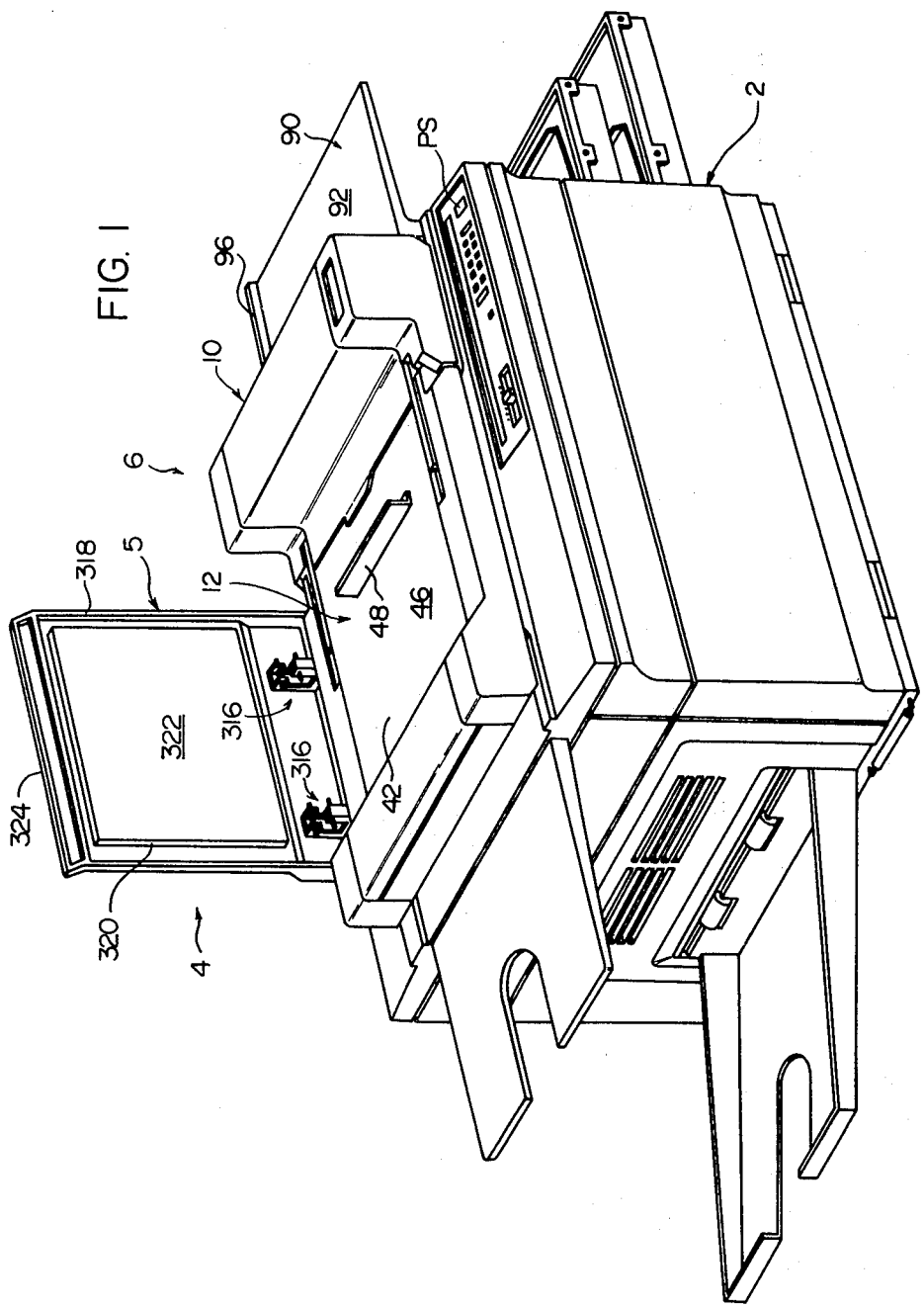
FIG. 1 is a perspective view of an electrostatic copying apparatus equipped with the document holding device and the semi-automatic document feeding and discharging device constructed in accordance with this invention, showing the state in which the main frame structure of the semi-sutomatic document feeding and discharging device is held at the operating position and the document holding member of the document holding device is held at the non-operating position.
Figure 2:
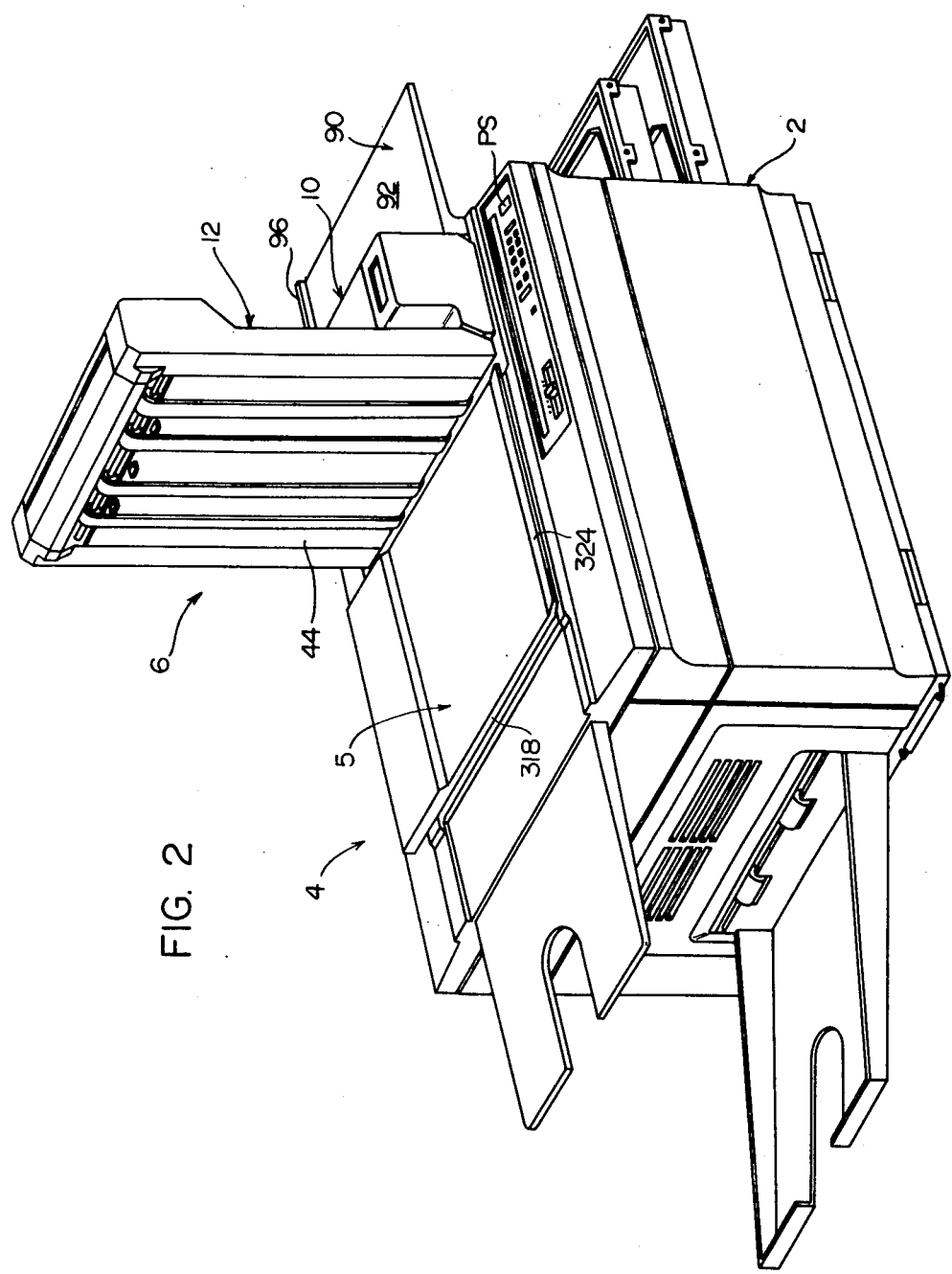
FIG. 2 is a perspective view of the electrostatic copying apparatus shown in FIG. 1, in which the main frame structure of the semi-automatic document feeding and discharging device is held at the non-operating position and the document holding member of the document holding device is held at the operating position.

With reference to FIGS. 1 and 2, a document holding device shown generally at 4 and a semi-automatic document feeding and discharging device shown generally at 6 are provided on the top of a housing 2 of an electrostatic copying apparatus which may be of a known type.

The semi-automatic document feeding and discharging device 6 in the illustrated embodiment includes a stationary support frame structure 10 mounted on the top of the housing 2 adjacent to one side edge of a transparent plate 8 (FIG. 3) disposed on the top of the housing 2, and a movable main frame structure 12 mounted for free turning about an axis extending along said one side edge of the transparent plate 8 and between an operating position (the position shown in FIG. 1) at which it covers the transparent plate 8 and a non-operating position (the position shown in FIG. 2 which is disppaced about 90° from the above operating position in a clockwise direction as viewed from the right bottom in FIGS. 1 and 2) at which it brings the transparent plate 8 to view. On the other hand, the document holding device 4 includes a holding member 5 for holding a document. The document holding member 5 is mounted such that it is free to turn between an operating position at which it covers the transparent plate 8 (the position shown in FIG. 2) and a non-operating position (the position shown in FIG. 1 displaced about 90° from the above operating position as viewed from the right top in FIGS. 1 and 2) at which it brings the transparent plate 8 to view, and about an axis extending along the other side edge of the transparent plate 8 which extends substantially at right angles to the pivot axis of the main frame structure 12 of the semi-automatic document feeding and discharging device 6.

In positioning a document to be copied on the transparent plate 8 by utilizing the semi-automatic document feeding and discharging device 6 in the above-illustrated electrostatic copying apparatus, the document holding member 5 of the document holding device 4 is brought to the non-operating position and the main frame structure 12 of the semi-automatic document feeding and discharging device 6 is brought to the operating position. When the document to be copied is to be positioned on the transparent plate 8 by a manual operation without utilizing the semi-automatic device 6 (for example, when the document is a thick one such as a book or the one having relatively high rigidity, such as a thick sheet of paper or a metal plate), the operator brings the main frame structure 12 of the semi-automatic device 6 to the non-operating position, then places the document on the desired site of the transparent plate 8, turns the document holding member 5 of the document holding device 4 to the above operating position, and thus covers the transparent plate 8 and the document thereon with the holding member 5. In withdrawing the document after the end of a copying cycle, the document holding member 5 is turned to the non-operating position.

Semi-automatic document feeding and discharging device

The construction of the semi-automatic document feeding and discharging device 6 constructed in accordance with this invention is described below in detail.

Figure 3:
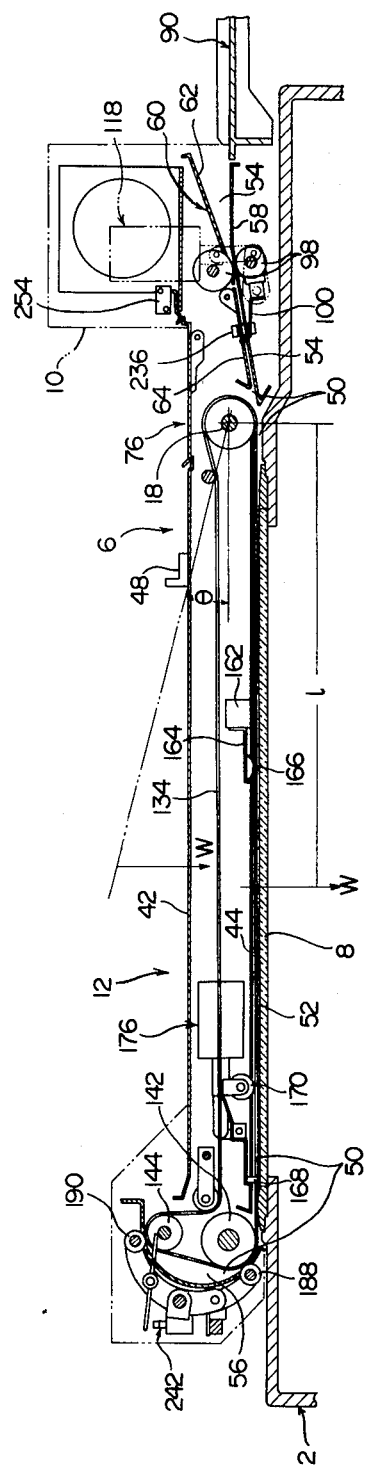
FIG. 3 is a sectional view of the semi-automatic document feeding and discharging device shown in FIG. 1.

With reference to FIG. 3 taken together with FIGS. 1 and 2, the semi-automatic device 6 includes the stationary support frame structure 10 and the movable main frame structure 12, as already mentioned above. As can be seen from FIG. 3, the support frame structure 10 is mounted on one end portion (the right end portion in FIG. 3) of the top of the housing 2 adjacent to one side edge of the transparent plate 8 fixed to the top of the housing 2. The main frame structure 12 is pivotally mounted on the support frame structure 10. With reference to FIGS. 4 to 6 together with FIG. 3, the method of mounting the main frame structure 12 on the support frame structure 10 is explained. The support frame 10 has a pair of upstanding walls 14a and 14b spaced widthwise from each other by a predetermined distance (i.e., a direction perpendicular to the sheet surface in FIG. 3), and a main shaft 18 is rotatably mounted between the upstanding walls 14a and 14b by means of bearing members 16a and 16b. The main frame structure 12 has a pair of side plates 20a and 20b spaced from each other a predetermined distance in the widthwise direction. One end portions of the side plates 20a and 20b are pivotally connected to the main shaft 18 through the bearing members 16a and 16b, respectively. Thus, the main frame structure 12 is mounted on the support frame structure 10 so that it is free to turn about the axis of the main shaft 18 extending along one side edge of the transparent plate 8. A mechanism of the below-described structure for forcibly holding the main frame structure 12 either at the aforesaid operating position (the position shown in FIG. 1) or the aforesaid non-operating position (the position shown in FIG. 2) is disposed between each of the upstanding walls 14a and 14b of the support frame structure 10 and each of the side paltes 20a and 20b of the main frame structure 12. With main reference to FIG. 4, a short shaft portion 22 projecting laterally and outwardly is formed on the outside surface of each of the upstanding walls 14a and 14b, and one end portion of a connecting arm 24 is pivotally connected to the short shaft portion 22. On the other hand, a pair of longitudinally spaced brackets 26 and 28 are fixed to the outside surface of each of the side plates 20a and 20b of the main frame structure 12. To these brackets 26 and 28 is mounted a rod 30 extending therebetween. The rod 30 can be mounted as desired to the brackets 26 and 28 by, for example, threadably fitting nuts 32 onto male screw threads formed on the opposite end portions of the rod 30 which extend through holes formed in the brackets 26 and 28. If desired, one of the nuts 32 may be formed integrally with the rod 30 as a one-piece structure. A block 34 is mounted slidably on the rod 30, and a coil spring 36 is interposed between the block 34 and the bracket 26. A pin 38 projecting late-rally and outwardly is fixed in the free end portion of the connecting arm 24. The free end portion of the connecting arm 24 is pivotally connected to the block 34 by inserting the pin 38 into a corresponding depression formed in the block 34. When the main frame structure 12 is turned between its operating position shown by full lines in FIG. 4 and its non-operating position shown by two-dotted chain lines in FIG. 4 in the aforesaid mechanism interposed between each of the upstanding walls 14a and 14b and each of the side plates 20a and 20b, the connecting arm 24 is also turned between the position shown by full lines in FIG. 4 and the position shown by two-dotted chain lines in FIG. 4, because the free end portion of the connecting arm 24 is connected to each of the side plates 20a and 20b of the main frame structure 12 through the pin 38, the block 34 and the rod 30. The side plates 20a and 20b of the main frame structure 12 turn about the main shaft 18, whereas each of the connecting arms 24 turns about the short shaft portion 22 which is displaced upwardly in the right direction in FIG. 4 from the main shaft 18. As can be easily understood from FIG. 4, therefore, the distance between the bracket 26 fixed to each of the side plates 20a and 20b of the main frame structure 12 and the free end portion of each connecting arm 24, in other words the distance between the bracket 26 and the block 34 whose position with respect to the rod 30 is restrained by the free end portion of the connecting arm 24, is shortest when the main frame structure 12 is at the operating position shown by full lines in FIG. 4, and progressively increases as it is turned toward the non-operating position shown by the two-dotted chain lines. Accordingly, the coil spring 36 interposed between the bracket 26 and the block 34 and acting in a direction to increase the distance between the block 34 and the bracket 26 exerts an elastic biasing force $M_1$ in a direction to turn the main frame structure 12 from the operating position shown by full lines in FIG. 4 toward the non-operating position shown by two-dotted chain lines in FIG. 4, namely in a direction to turn the main frame structure 12 clockwise as viewed from the right bottom in FIG. 4. The elastic biasing force $M_1$ of the coil spring 36 is largest when the main frame structure 12 is at the operating position shown by full lines in FIG. 4, and progressively decreases aa it is turned toward the non-operating position. In addition to the elastic biasing force $M_1$ of the coil spring 36, a force to be described below is also exerted on the main frame structure 12 owing to the weight of the main frame structure 12 and various constituent elements (to be described later) mounted thereon. Specifically, as can be readily understood from FIG. 3, the weight W of the main frame structure 12 and the various constituent elements mounted thereon exerts a moment, $M_2 = W \times 1$, in a counterclockwise direction in FIG. 3 (counterclockwise direction viewed from the right bottom in FIG. 4) on the main frame structure 12 when the main frame structure 12 is at the operating position shown in FIG. 3. The moment $M_2$ decreases to $M = W \times 1 \times \cos\theta$ when the main frame structure 12 is turned by an angle $\theta$ clockwise in FIG. 3 from the operating position toward the non-operating position. In other words, the moment $M_2$ progressively decreases as the main frame structure 12 is turned clockwise in FIG. 3 from the operating position toward the non-operating position. The illustrated embodiment is designed such that when the main frame structure 12 is at the operating position shown by full lines in FIGS. 3 and 4, the moment $M_2$ by the weight W which acts to turn the main frame structure 12 counterclockwise in FIG. 3 (counterclockwise as viewed from the right bottom in FIG. 4) is larger than the elastic biasing force $M_1$ of the coil spring 36 acting to turn the main frame structure 12 clockwise in FIG. 3 (clockwise as viewed from the right bottom in FIG. 4) [$M_2 > M_1$]; when the main frame structure 12 is to be turned from the aforesaid operating position toward the non-operating position clockwise in FIG. 3 (clockwise as viewed from the right bottom in FIG. 4), the degree of decrease of the moment $M_2$ by the weight W is larger than the degree of decrease of the elastic biasing force $M_1$; and that when the main frame structure 12 is turned from the operating position to the non-operating position by a predetermined angle $\theta_s$ which is, for example, 50° to 60°, $M_1$ becomes equal to $M_2$ ($= W \times 1 \times \cos\theta_s$), and when the main frame structure 12 is further turned toward the non-operating position beyond the angle $\theta_s$, $M_1$ becomes larger than $M_2$ ($M_1 > M_2$). Hence, when the main frame structure 12 is turned beyond the above angle $\theta_s$, it is forcibly held at the non-operating position by the elastic biasing force $M_1$ ($M_1 > M_2$) by the coil spring 36.

When the main frame structure 12 is held at the non-operating position shown by two-dotted chain lines in FIG. 4, each block 34 abuts against a stop piece 40 fixed to each of the side plates 20a and 20b of the main frame structure 12, whereby the main frame structure 12 is prevented from turning clockwise as viewed from the right bottom in FIG. 4 beyond the above nonoperating position. On the other hand, when the main frame structure 12 is turned from the non-operating position toward the operating position in a counterclockwise direction as viewed from the right bottom in FIG. 4 beyond the angle $\theta_s$, the main frame structure 12 is forcibly moved to, and held at, the operating position by the moment $M_2$ ($M_2 > M_1$) by the weight W.

The structure of the main frame structure 12 itself is described with reference to FIGS. 1 to 3. The main frame structure 12 has an upper plate 42 disposed between the upper edges of the side plates 20a and 20b and a lower plate 44 disposed between the lower edges of the side plates 20a and 20b. The upper plate 42 defines a substantially flat, document receiving surface 46 on the top side of the main frame structure 12. As will be described below, the document receiving surface 46 receives the document discharged from the main frame structure 12. Preferably, a restraining member 48 for restraining the leading edge of the document discharged onto the receiving surface 46 to put it in order is secured to the top side of the upper plate 42 in such a manner that its position can be adjusted according to the size of the document. The position-adjustable securing of the restraining member 48 to the top side of the upper plate 42 can be effected, for example, by making at least a part of the restraining member 48 from a permanent magnet and fixing it to a desired position of the top side of the upper plate 42 by the magnetic attracting force of the permanent magnet. When the main frame structure 12 is held at the operating position as shown in FIG. 3, the lower plate 44 defining the under side of the main frame 12 is positioned slightly upwardly of, and substantially parallel to, the transparent plate 8 to define a main section 52 of a document conveying passage 50 between it and the top side of the transparent plate 8.

The document conveying passage 50 additionally has an introducing section 54 located upstream of the main portion 52 and a curved discharging section 56 connecting the main portion 52 to the document receiving surface 46. In the illustrated embodiment, the introducing section 54 is defined in the support frame structure 10, and the curved discharging section 56 is defined in the other end portion, i.e. the free end portion (the left end portion in FIG. 3) of the main frame structure 12.

With reference to FIGS. 5, 6 and 7-A taken in conjunction with FIG. 3, the introducing section 54 of the document conveying passage 50 is defined between a lower guide plate 58 and an upper guide plate 60 spaced vertically from each other between the pair of upstanding walls 14a and 14b of the support frame structure 10. The lower guide plate 58 is held at a predetermined position by fixing its both side edge portions respectively to the upstanding walls 14a and 14b. The upper guide plate 60 is divided into a first section 62 located upstream and second section 64 located downstream. The first section 62 is held at a predetermined position by fixing its both side edge portions respectively to the upstanding walls 14a and 14b. On the other hand, by pivotally connecting linking pieces 66 projecting upwardly from both sides of the upstream end of the second section 64 to pins 68 projecting laterally and inwardly and fixed in the inside surfaces of the upstanding walls 14a and 14b, the second section 64 of the guide plate 60 is mounted such that it is free to turn between the position shown by full lines in FIG. 7-A, that is, an operating position at which it defines the downstream portion of the introducing section 54 in cooperation with the lower guide plate 58 and the position shown by two-dotted chain lines in FIG. 7-A, that is, a non-operating position at which the downstream portion of the introducing section 54 is opened (see FIGS. 5 and 6 together with FIG. 7-A). As shown in FIG. 6, pins 70 are fixed in the inside surfaces of the upstanding walls 14a and 14b, and springs 74 are interposed respectively between the pins 70 and projecting pieces 72 formed in the opposite side edges of the second section 64 of the upper guide plate 60. These springs 74 elastically bias the second section 64 of the upper guide plate 60 either to the operating position shown by full lines in FIG. 7-A and two-dotted chain lines in FIG. 6 or the non-operating position shown by full lines in FIG. 6 and two-dotted chain lines in FIG. 7-A (in other words, the springs 74 assume a dead-point state wherein they are most compressed between the operating position and the non-operating position).

Having regard to the pivotal mounting of the second section 64 of the upper guide plate 60, a closure member 76 adapted for free opening and closing is provided above the second section 64. With reference to FIGS. 5 and 6 taken together with FIG. 7-A, downwardly projecting linking pieces 78 are provided respectively at both side portions of one end portion (the right end portion in FIG. 7-A) of the closure member 76. The linking pieces 78 are pivotally linked to pins 80 projecting laterally and inwardly and fixed respectively in the inside surfaces of the upstanding walls 14a and 14b. As a result, the closure member 76 is mounted such that it is free to turn between its closed position shown by full lines in FIGS. 5 and 7-A and two-dotted chain lines in FIG. 6 and its opened position shown by full lines in FIG. 6 and two-dotted chain lines in FIG. 7-A. At the closed position, the free end (the left end in FIG. 7-A) of the closure member 76 engages the top side of one edge (the right-hand edge in FIG. 7-A) of the upper plate 42 of the mian frame structure 12. Hence, the closure member 76 is brought to the opened position shown by full lines in FIG. 6 and two-dotted chain lines in FIG. 7-A by gripping a grip portion 82 formed at its free end and thus turning it clockwise in FIG. 7-A. Furthermore, when the main frame structure 12 is held at the non-operating position shown by full lines in FIG. 2 and two-dotted chain lines in FIG. 4, the closure member 76 is turned clockwise in FIG. 7-A following the upper plate 42 of the mian frame structure 12, and, therefore, held at the closed position shown by full lines in FIG. 6 and two-dotted chain lines in FIG. 7-A. A suspending piece 84 is provided on the back of the closure member 76, and an upstanding piece 86 is provided on the top side of the second section 64 of the upper guide plate 60. The suspending piece 84 is linked to the upstanding piece 86 by means of a linking piece 88 such as a wire so that the second section 64 of the upper guide plate 60 is turned interlockingly with the closure member 76. Specifically, when the closure member 76 is at the closed position shown by full lines in FIG. 7-A and two-dotted chain lines in FIG. 6, the second portion 64 of the upper guide plate is held at the operating position at which it defines the downstream portion of the introducing section 54 in cooperation with the lower guide plate 58. When the closure member 76 is brought to the opened position shown by two-dotted chain lines in FIG. 7-A and full lines in FIG. 6 by turning the closure member 76 itself, or bringing the main frame structure 12 to the non-operating position, the second section 64 of the upper guide plate 60, in interlocking relation to the pivotal movement of the closure member 76 to its closed position, is turned to the non-operating position shown by full lines in FIG. 6 and two-dotted chain lines in FIG. 7-A to open the downstream portion of the introducing section 54. It will be appreciated therefore that in the event of jamming of the document in the down stream portion of the introducing section 54 of the document conveying passage 50, it is only necessary to turn the closure member 76 itself or bring the main frame structure 12 to the non-operating position, as a result of which the closure member 76 is held at the open position to permit opening of the downstream portion of the introducing section 54, and the document in the jammed state can be easily removed from the downstream portion of the introducing section 54.

As shown in FIGS. 1,2 and 7-A, a document stand 90 is annexed to the upstream side of the support frame structure 10 in the illustrated embodiment. As FIG. 7-A clearly shows, the surface of the document stand 90 defines a guide surface 92 for manually positioning a document to be copied, which joins the upstream end of the introducing section 54 of the document conveying passage 50. On the surface of the document stand 90 is formed a guiding protrusion 96 which restrains the position of one side edge of a document 96 (FIG. 7-A) placed on the guide surface 92 for insertion into the introducing section 54 of the conveying passage 50 and thus restricts the position of the document 94 in the widthwise direction, as will be described hereinbelow.

In the introducing section 54 of the document conveying passage 50, there are further provided a conveying roller unit 98 for econveying the document 94 inserted into the introducing section 54 to the main section 52 through the introducing section 54 and a first regulating member 100 for regulating the position of the document, which projects into the introducing section 54 at a position downstream of the conveying roller unit 98 and can arrest the advancing of the document 94 passing through the introducing section 54.

Figure 11:
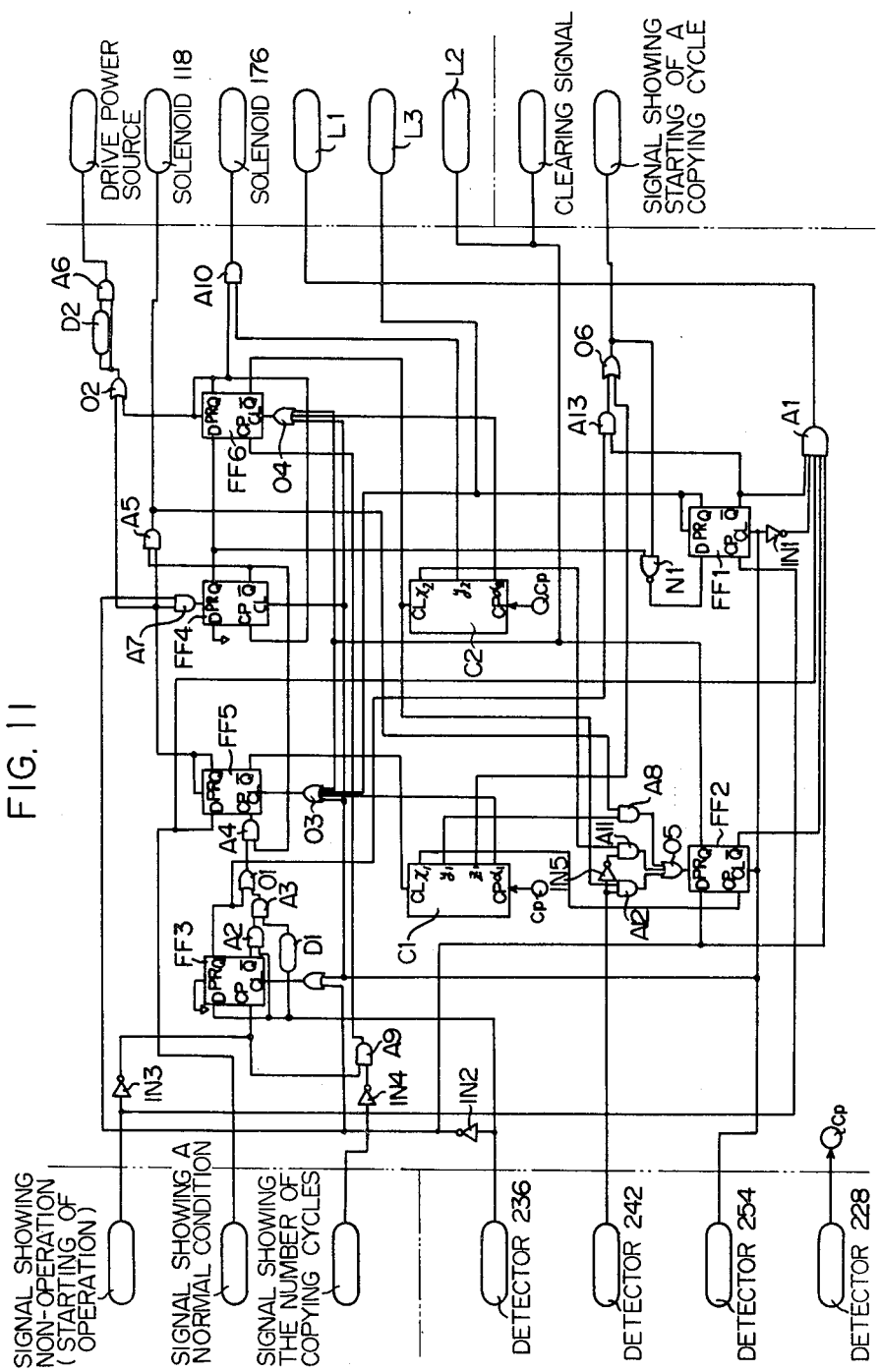
FIG. 11 is a simplified circuit diagram showing a controlling circuit for the semi-automatic document feeding and discharging device shown in FIG. 1.

With reference to FIGS. 5,6, 7-A and 7-B, the conveying roller unit 98 constitutes a document conveying mechanisms for conveying the document 94 through the conveying passage 50 together with endless conveyer belts and conducting rollers for conducting the document, which are to be described hereinbelow, and is comprised of driven rollers 102 and follower rollers 104. With special reference to FIG. 5, a support shaft 108 is rotatably mounted between the upstanding walls 14a and 14b of the support frame structure 10 by means of bearing members 106a and 106b. The support shaft 108 has mounted thereon at least one driven roller 102 (in the illustrated embodiment, four driven rollers spaced from each other widthwise). A suspending rod 110 extending widthwise is rotatably mounted between the upstanding walls 14a and 14b. Brackets 112 projecting in the upstream direction (only one of them is shown in FIG. 5) are fixed respectively to the opposite end portions of the suspending rod 110, and a support shaft 114 is mounted rotatably between the brackets 112. At least one follower roller 104 (four follower rollers 104 spaced widthwise from each other in the illustrated embodiment) cooperating with the driven rollers 102 is mounted on the support shaft 114. An arm 116 is fixed to one end portion of the suspending rod 110 which projects laterally and outwardly through the upstanding wall 14b. To the free end portion of the arm 116 is pivotally connected the output terminal of a solenoid 118 fixed to the outside surface of the upstanding wall 14b. It is appreciated from FIGS. 5 and 7-A that the driven rollers 102 always project downwardly into the introducing section 54 of the conveying passage 50 through cutouts 120 formed in the first section 62 of the upper guide plate 60, whereas, in a normal state in which the solenoid 118 is deenergized, the follower rollers 104 are held at a non-operating position at which they are away from the driven rollers 102 and located below the lower guide plate 58. But upon the energization of the solenoid 118, the suspending rod 110 is turned in the direction shown by an arrow 122 in FIG. 5. As a result, the follower rollers 104 project upwardly into the introducing section 54 of the document conveying passage 50 through openings 123 formed in the lower guide plate 58 as shown in FIG. 7-B and are held at an operating position at which they contact or approach the driven rollers 102. When in this state, the document 94 is located in the introducing section 54 of the conveying passage 50, the document 94 is nipped between the driven rollers 102 and the follower rollers 104. Alternatively, the driven rollers 102 and the follower rollers 104 may be caused to contact or approach each other by moving the driven rollers 102 or both the driven rollers 102 and the follower rollers 104 instead of moving the follower rollers 104 as described above. As clearly shown in FIG. 5, a toothed belt wheel 124 is mounted on one end portion of the support shaft 108 having the driven rollers 102 mounted thereon, i.e., that end portion which projects laterally and outwardly through the upstanding wall 14a. The toothed belt wheel 124 is connected to a suitable drive power supply (see FIG. 11) such as an electric motor disposed within the support frame structure 10. When the drive power supply is energized, the support shaft 108 and the driven rollers 102 mounted thereon are rotated in a direction of arrow 128. Accordingly, when the follower rollers 104 are held at the operating position shown in FIG. 7-B, the document 94 nipped between the driven rollers 102 and the follower rollers 104 is advanced through the introducing section 54 of the conveying passage 50 and sent to the main section 52.

In the illustrated embodiment, the first regulating member 100 for regulating the position of a document is comprised of four projecting pieces spaced from each other in the widthwise direction, as shown in FIG. 5. Since the illustrated first regulating member 100 is fixed to the suspending rod 110, it is moved by the action of the solenoid 118 as a unit with the follower rollers 104 of the conveying roller unit 98. When the solenoid 118 is deenergized (therefore, when the follower rollers 104 are at the non-operating position), the free end portion of the first regulating member 100, as shown in FIGS. 5 and 7-A, projects into the introducing section 54 of the conveying passage 50 through an opening 130 formed in the lower guide plate 58, then moves across the introducing section 54, and further projects into an opening 132 formed in the second section 64 of the upper guide plate 60, thus being held at an arresting position at which it hampers the advancing of the document 94 passing through the introducing section 54 of the document conveying passage 50. On the other hand, when the solenoid 118 is energized (therefore, the follower rollers 104 are held at the operating position), the free end portion of the first regulating member 100, as shown in FIG. 7-B, recedes from the introducing section 54 of the document conveying passage 50 to a position below the lower guide plate 58 and is thus held at a non-arresting position at which it permits the advancing of the document 94 through the introducing section 54 of the document conveying passage 50.

As shown in FIG. 3, the illustrated semi-automatic device 6 for feeding and discharging an original document additionally includes at least one endless conveyer belt 134 (in the illustrated embodiment, four endless conveyer belts 134 spaced from each other in the widthwise direction) (see FIGS. 5 and 8 also) for conveying the documents, which has been sent to the main section 52 of the conveying passage 50 from the introducing section 54, through the main section 52, further conveying it from there through the curved discharging section 56 and discharging it onto the document receiving surface 46. As shown in FIG. 5, four rollers 136 spaced from each other in the widthwise direction are mounted on the main shaft 18, and as shown in FIGS. 8 and 10-A, support shafts 138 and 140 are rotatably mounted between the side plates 20a and 20b of the main frame structure 12 at the free end portion (the left end portion in FIG. 3) of the main frame structure 12. Four rollers 142 spaced from each other widthwise (only one of them is shown in FIGS. 8 and 10-A) are mounted on the support shaft 138, and likewise, four rollers 144 (only one of them is shown in FIGS. 8 and 10-A) spaced from each other widthwise are mounted on the support shaft 140. Each of the four endless conveyer belts 134 is stretched over each of the rollers 136 mounted on the main shaft 18, each of the rollers 142 mounted on the support shaft 138 and each of the rollers 144 mounted on the support shaft 140, and has an operating running section extending from each of the rollers 136 to each of the rollers 142 through the main section 52 of the document conveying passage 50 (therefore, under the lower plate 44), an operating running section extending from the roller 142 to each of the rollers 144 through the curved discharging section 56 of the document conveying passage 50, and a non-operating running section extending from the roller 144 to the roller 136 between the upper plate 42 and the lower plate 44. As shown in FIGS. 5 and 7-A, a guide rod 146 is rotatably mounted adjacent to the main shaft 18 and between the side plates 20a and 20b of the main frame structure 12. The guide rod 146 guides these endless conveying belts 134 respectively to insure their sufficient wrapping contact with the rollers 136. Furthermore, as shown in FIGS. 8 and 10-A, adjacent to the support shafts 138 and 140, a support rod 148 is mounted between the side plates 20a and 20b of the main frame structure 12, and four supporting arms 150 spaced from each other widthwise (only one of them is shown in FIGS. 8 and 10-A) are pivotally mounted on the support rod 148. To the free end of each of these supporting arms 150 is rotatably mounted a tension setting roller 152 which is adapted to act on each of the endless conveyer belts 134 to set its tension at a desired value. The tension of each of the endless conveyer belts 134 can be set at the desired value by adjusting the angular position of each of the supporting arms 150 and therefore the position of the tension setting roller 152. This adjustment of the position can be effected by adjusting the screwing degree of an adjusting screw 154 which extends through a projecting portion in the supporting arm 150 and is threadably received in a stationary member 153 located therebeneath. Turning now again to FIG. 5, one end portion of the main shaft 18 which projects laterally and outwardly through the side plate 20a has a toothed belt wheel 156 mounted thereon, and one end portion of the support shaft 108 having the driven rollers 102 of the conveyer roller unit 98 mounted thereon, i.e., that end portion of the shaft 108 which projects laterally and outwardly through the upstanding wall 14a, has mounted thereon a toothed belt wheel 158 in addition to the toothed belt wheel 124. A timing belt 160 is stretched over the toothed belt wheels 156 and 158. It will be appreciated therefore that the main shaft 18 is connected to the support shaft 108 and, therefore, is connected to a suitable drive power supply (see FIG. 11) such as an electric motor through the support shaft 108. When the drive power supply is energized, the support shaft 108 is rotated in the direction of arrow 128 and, therefore, the main shaft 18 and the rollers 136 are also rotated in the direction of arrow 128. Thus, the endless conveyer belts 134 are moved in the direction of arrow 128.

In the illustrated embodiment, four blocks 162 (only one of them is shown in FIG. 3) are fixed to the top side of the lower plate 44 of the main frame structure 12 in spaced-apart relationship in the direction of the width at positions corresponding to the nearly intermediate part of the main section 52 of the document conveying passage 50 as viewed in the document conveying direction, as shown in FIG. 3. A plate spring 164 is fixed to each of these blocks 162, and a hemispherical pressing piece 166 is fixed to the free end of the plate spring 164. The pressing piece 166 is elastically biased downwardly by the elastic biasing action of the plate spring 164 to project downwardly through an opening formed in the lower plate 44. Then, the pressing piece 166 presses the back of each of the endless conveyer belts 134 to cause the surface of each endless conveyer belt 134 to contact or approach the surface of the transparent plate 8, and when a document (not shown in FIG. 3) exists in the nearly intermediate part of the main section 52 of the conveyer passage 50, presses the surface of each of the endless conveyer belts 134 against the document.

The main section 52 of the conveying passage 50 further has provided therein a second regulating member 168 for regulating the position of a document, which projects into that portion of the main section 52 of the conveying passage 50 which is near its downstream end to arrest the advancing of the document, and a pressing roller 70 which presses the back of each of the endless conveyer belts 134 slightly upstream of the position at which the second regulating member 168 arrests the advancing of the document, thereby causing the surface of each of the endless conveyer belts 134 to contact or approach the surface of the transparent plate 8.

With reference to FIGS. 8 and 10-A, a suspending rod 172 is rotatably mounted between the side plates 20a and 20b of the main frame structure 12. In the illustrated embodiment, the second regulating member 168 is constructed of one projecting piece (or a plurality of projecting pieces spaced from each other in the widthwise direction) fixed to the suspending rod 172. To the top side of the suspending rod 172 is fixed a linking piece 174 to which is pivotally connected the output terminal of a solenoid 176 fixed in place to the main frame structure 12. When the solenoid 176 is deenergized, the second regulating member 168 extends through an opening 178 formed in the lower plate 44, projects into the main section 52 of the conveying passage 50 between the endless conveyer belts 134, and is thus held at its arresting position at which to arrest the advancing of the document passing through the main section 52, as shown by full lines in FIGS. 8 and 10-A. It is critical that as illustrated in FIG. 10-A, the position at which the second regulating member 168 arrests the advancing of the document should exist in the vicinity of the front edge (the left end edge in FIG. 10-A) of the transparent plate 8. On the other hand, when the solenoid 176 is energized, the suspending rod 172 is turned in the direction shown by an arrow 180, and the second regulating member 168 recedes from the main section 52 of the document conveying passage 50 and is held at its non-arresting position at which to permit the advancing of the document, as shown by two-dotted chain lines in FIG. 10-A.

The suspending rod 172 further has fixed thereto four supporting arms 182 spaced from each other in the widthwise direction (three of these supporting arms 182 are shown in FIG. 8), and the aforesaid pressing roller 170 is rotatably mounted on each of these supporting arms 182. Accordingly, the pressing rollers 170 in the illustrated embodiment are moved as a unit with the second regulating member 168 by the action of the solenoid 176. When the solenoid 176 is in the deenergized state (therefore, when the second regulating member 168 is held at the arresting position described above), each of the pressing rollers 170 is located above the lower plate 44, as shown by full lines in FIGS. 8 and 10-A, and, therefore, held at a non-operating position at which it does not act on the endless conveyer belts 134. On the other hand, when the solenoid 176 is energized (therefore, when the second regulating member 168 is held at the non-arresting position), each of the pressing rollers 170 projects downwardly through an opening 184 formed in the lower plate 44 as shown by two-dotted chain lines in FIG. 10-A to press the back of the endless conveyer belt 134 and thus cause the surfaces of the endless conveyer belts 134 to contact or approach the surface of the transparent plate 8. Hence, when a document (not shown in FIGS. 8 and 10-A) exists in the downwstream end portion of the main section 52 of the document conveying passage 50, the surfaces of the endless conveyer belts 134 are pressed against the document.

Figure 9:
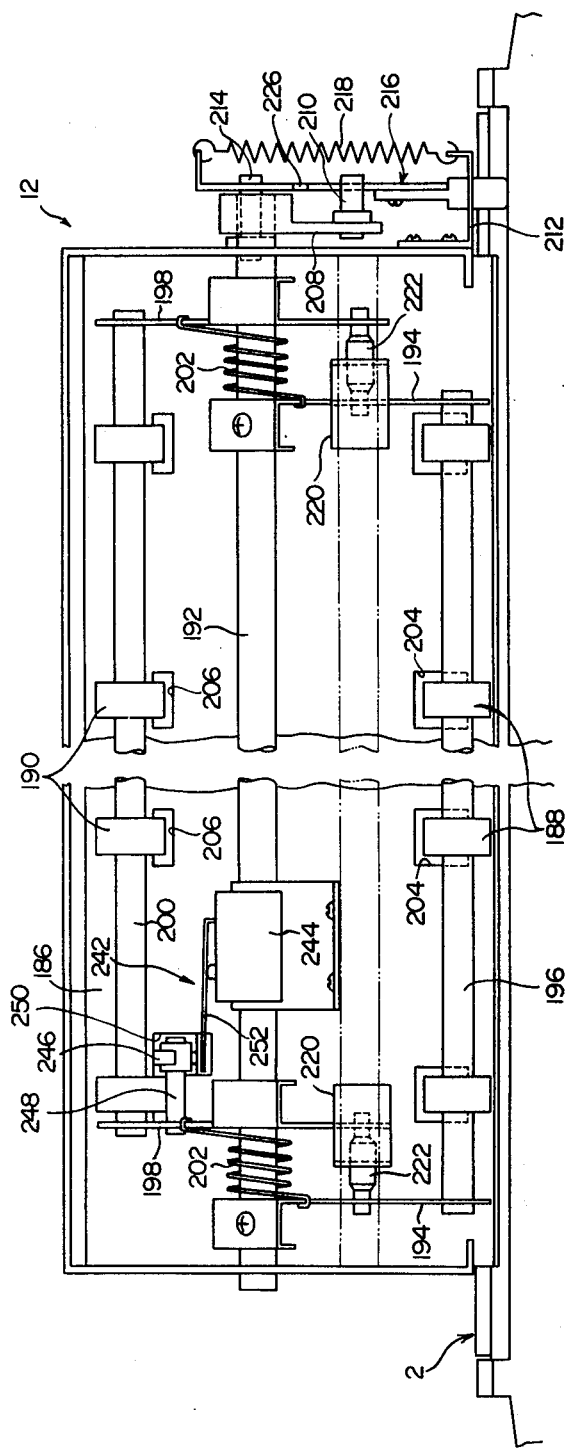
FIG. 9 is a side elevation, partly broken away, of a part of the semi-automatic document feeding and discharging device shown in FIG. 1.

Now, with reference to FIGS. 8, 9, and 10, the curved discharging section 56 of the document conveying passage 50 in the illustrated embodiment is defined by a guide plate 186 which is arcuate in cross section and fixed to the free end portions of the side plates 20a and 20b of the main frame structure 12. As is clearly shown in FIG. 10-A, the guide plate 186 is located opposite to the rollers 142 and 144 over which the endless conveyer belts 134 are stretched. It guides upwardly a document (not shown in FIGS. 8, 9, and 10-A) carried from the main section 52 of the conveying passage 50 and conducts it to the document receiving surface 46 defined by the top side of the upper plate 42. In the curved discharging section 56 of the convey-conveying passage 50, there are disposed upstream-side document-discharging rollers 188 which are caused to contact or approach the endless conveyer belts 134 at a position opposite to the rollers 142 and downstream-side document-discharging rollers 190 which are caused to contact or approach the surfaces of the endless conveyer belts 134 at a position opposite to the rollers 144. The method of mounting the upstream-side discharging rollers 188 and the downstream-side discharging rollers 190 is described below. As shown in FIGS. 8 and 9, a suspending rod 192 is rotatably mounted between the free ends of the side plates 20a and 20b of the main frame structure 12, and downwardly extending supporting arms 194 are fixed to the opposite end portions of the suspending rod 192. A support shaft 196 is mounted rotatably on the supporting arms 194, and four upstream-side document-discharging rollers 188 spaced widthwise from each other are mounted on the support shaft 196. Furthermore, supporting arms 198 are mounted to the opposite end portions of the suspending rod 192, and a support shaft 200 is rotatably mounted on the supporting arms 198. Four downstream-side document-discharging rollers 190 are mounted on the support shaft 200. A spring 202 is interposed between each of the supporting arms 194 and each of the supporting arms 198. The spring 202 elastically biases the suspending rod 192 and each supporting arm 194 fixed to it in the counterclockwise direction as viewed from the right bottom in FIG. 8, as a result of which each of the upstream-side document-discharging rollers 188 mounted on the support shaft 196 projects into the curved discharging section 56 throught an opening 204 formed in the guide plate 186, and makes elastic with the surface of each of the endless conveyer belts 134. Simultaneously, the spring 202 elastically biases each supporting arm 198 in the clockwise direction as viewed from the right bottom in FIG. 8; thus, each of the downstream-side document-discharging rollers 190 projects into the curved discharging section 56 through an opening 206 formed in the guide plate 186 and makes elastic contact with the surface of each of the endless conveyer belts 134.

In the illustrated embodiment, an additional mechanism is provided which, when the main frame structure 12 is moved from its operating position toward its non-operating position, automatically brings, against the elastic biasing action of the springs 202, the upstream-side discharging rollers 188 and the downstream-side discharging rollers 190 from an operating position at which they contact the surfaces of the endless conveyer belts 134 to a non-operating position at which they are away from the surfaces of the endless conveyer belts 134. This mechanism is described in detail with reference to FIGS. 8 and 9. A projecting piece 208 is fixed to one end portion of the suspending rod 192 which projects laterally and outwardly through the side plate 20b, and a pin 210 is fixed in the projecting piece 208. On the other hand, a bracket 212 and a pin 214 are fixed to the outside surface of the side plate 20b, and a sliding piece 216 is supported by the bracket 212 and the pin 214 such that it is free to slide upwardly and downwardly. A coil spring 218 capable of elastically biasing the sliding piece 216 downwardly is stretched between the sliding piece 216 and the bracket 212. A pair of brackets 220 are fixed to the main frame structure 12, and an interlocking piece 222 is oscillably supported on each of these bracets 220. The interlocking piece 222 is linked at one end to the supporting arm 194 and at the other to the supporting arm 198. In this mechanism, when the main frame structure 12 is held at the operating position, the lower end of the sliding piece 216 projecting through the bracket 212 abuts against the top side of the housing 2 of the copying apparatus, whereby the sliding piece 216 is kept in the state shown in FIGS. 8, 9 and 10-A. However, when the main frame structure 12 is lifted from its operating position toward its non-operating position as shown in FIG. 10-B, the elastic biasing action of the coil spring 218 causes the sliding piece 216 to move downwardly to a position at which the upper end of an elongated slot 224 formed in the sliding piece 216 abuts against the pin 214. As a result, a projecting portion 226 formed in the sliding piece 216 abuts against the pin 210 to turn the suspending rod 192 and the supporting arms 194 clockwise in FIGS. 10-A and 10-B; as a result, the upstream-side document-discharging rollers 188 move away from the surfaces of the endless conveyer belts 134 to the rear of the guide plate 186 and are held at the non-operating position shown in FIG. 10-B. Simultaneously, the aforesaid pivotal movement of the supporting arms 194 oscillates the interlocking pieces 222 in the counterclockwise direction as viewed from top in FIG. 8. As a result, the supporting arms 198 are turned counterclockwise in FIGS. 10-A and 10-B, and the downstream-side document-discharging rollers 190 also move away from the surfaces of the endless conveyer belts 134 to the rear of the guide plate 186 and are held at the non-operating position shown in FIG. 10-B. Accordingly, when the document jams in the curved discharging section 56 of the conveying passage 50, it is only necessary to lift the main frame structure 12 from its operating position toward its non-operating position. This lifting operation results in automatic holding of the upstream-side document-discharging rollers 188 and the downstream-side document-discharging rollers 190 at the non-operating position shown in FIG. 10-B, and, therefore, the document can be very easily taken out from the discharging section 56.

The semi-automatic document feeding and discharging device 6 illustrated in the drawings further has various detectors constituting part of control means for controlling the operations of various constituent elements.

With reference to FIG. 5, there is provided a detector 228 for detecting the amount of rotation of the support shaft 108, or the amount of the conveying roller unit 98 and the endless conveyer belts 134 driven. The detector 228 is comprised of a plate 230 mounted to one end portion of the support shaft 180 projecting laterally and outwardly through the upstanding wall 14a and an optical detector 232 located astride the plate 230. The plate 230 has a plurality of cuts 234 on its edge portion in circumferentially spaced-apart relationship, and the optical detector 232 has a light-emitting element located on one side of the plate 230 and a light-receiving element located on the other side. When the plate 230 is rotated in response to the rotation of the supporting shaft 108, the light from the light-emitting element of the optical detector 232 is received by the light-receiving element every time each cut 234 of the plate 230 moves past the optical detector 232. Thus, the optical detector 232 produces a pulse signal. Accordingly, by counting the pulse signals produced by the optical detector 232, the amount of the support shaft 108 rotated, or the amount of the conveying roller unit 98 and the endless conveyer belts 134 driven or operated, can be detected.

Furthermore, as shown in FIGS. 3, 5, 6 and 7-A, a first document detector 236 is provided which detects a document upstream of the position at which the first document-position regulating member 100 in the introducing section 54 of the document conveying passage 50 arrests the advancing of the document. The first document detector 236 in the illustrated embodiment is comprised of an optical detector having a light-emitting element and a light-receiving element disposed below the lower guide plate 58 defining the introducing section 54 of the conveying passage 50 and above the second portion 64 of the upper guide plate 60. It keeps watch on the introducing section 54 through an opening 238 formed in the lower guide plate 58 and an opening 240 formed in the second section 64 of the upper guide plate 60 at a position upstream of the arresting position at which the first document-position regulating member 100 arrests the advancing of the document; and thus detects the document which passes through the introducing section 54.

As shown in FIGS. 3, 8, 9, and 10-A, a second document detector 242 is provided which detects a document at the curved discharging section 56 of the document conveying passage 50. In the illustrated embodiment, the second document detector 242 is comprised of a microswitch 244 disposed on the rear side of the guide plate 186 and an actuating piece 246 for the microswitch 244. The actuating piece 246 is rotatably mounted on a pin 248 fixed in one of the supporting arms 198, and has a sensing section projecting into the curved discharging section 56 through an opening 250 formed in the guide plate 186 and an actuating section located opposite to an actuator 252 of the microswitch 244. The actuating piece 246 is normally kept in the state shown in FIG. 10-A. But when a document moving through the curved discharging section 56 makes contact with the sensing section, the actuating piece 246 is rotated counterclockwise in FIG. 10-A, whereby its actuating section presses the actuator 252 to change over microswitch 244.

There is further procided a detector 254 for detecting the position of the main frame structure 12 as shown in FIGS. 3, 5 and 7-A. In the illustrated embodiment, the detector 254 is comprised of a microswitch having an actuator 256. When the main frame structure 12 is held at the operating position and the closure member 76 is held at the closed position as shown by full lines in FIG. 7-A, a projecting piece 258 formed at the rear edge of the closure member 76 presses the actuator 256 to maintain the detector 254 in a first condition, i.e. an opened condition. On the other hand, when the main frame structure 12 is held at the non-operating position shown in FIG. 2 and in response thereto, the closure member 76 is held at the opened position shown by full lines in FIG. 6 and two-dotted chain lines in FIG. 7-A, the projecting piece 258 moves out of contact with the actuator 256 to maintain the detector 254 in a second condition, i.e. a closed condition. When the closure member 76 itself is operated and brought to the opened state while the main frame structure 12 is held at the operating position, the projecting piece 258 comes out of contact with the actuator 256 so that the second condition (i.e., the closed condition) can also be obtained.

The operation of the semi-automatic document feeding and discharging device 6 described above is summarized below with reference to FIG. 11 which shows a control circuit diagram sonstituting control means together with the aforesaid detectors 228, 236, 242 and 254.

(I) From the manual positioning of a document to the starting of feeding the document:

(I-i) Preparatory operation

To feed and discharge a document semi-automatically utilizing the semi-automatic document feeding and discharging device 6, the operator sets the main frame structure 12 at the operating position and the closure member 76 at the closed position, as shown in FIGS. 1 and 3. As a result, the detector 254 for detecting the position of the main frame structure 12 is maintained in the first condition (i.e., the opened condition), and produces a signal "L". If a trouble to be described, such as jamming of a copying paper in the electrostatic copying apparatus proper or jamming of a document in the semi-automatic document feeding and discharging device 6, does not occur at this time, a main control means (not shown) of the electrostatic copying apparatus proper supplies a normal signal "H" showing a normal condition to an AND gate A1. At the same time, signals "H" are fed to the AND gate A1 respectively from the output terminal $\overline{Q}$ of a flip-flop FF1 in the reset state, from the detector 254 through an inverter IN1, from the output terminal $\overline{Q}$ of a flip-flop FF2 in the reset state, and also from the first document detector 236 which is not detecting a document and is producing an output signal "L" through an inverter IN2. Thus, the signal "H" is produced at the output terminal of the AND gate A1. The signal "H" is supplied to a lamp L1 which shows the completion of preparations for the semi-automatic feeding and discharging of the document, and the lamp L1 is turned on.

(I-ii) Manual positioning of the document

After the lamp L1 has been turned on, the operator manually places a document 94 (FIG. 7-A) to be copied on the guide surface 92 of the document stand 90, advances the document 94 while its one edge is kept in contact with the guiding protrusion 96 to insert the front part of the document 94 partly into the introducing section 54 of the conveying passage 50. As a result, the front edge of the document 94 is caused to contact or approach the first document-position regulating member 100 held at the arresting position, as shown in FIG. 7-A. When this state is obtained, the first document detector 236 detects the document 94 to produce a signal showing the completion of the manual positioning of the document; in other words, the output signal of the first document detector 236 is "H". Hence, the signal fed to the AND gate A1 through the inverter IN2 from the first document detector 236 becomes "L" to turn off the lamp L1. As will be stated hereinbelow, the lamp L1 is again turned on when the trailing end of the document 94 advances past the detecting position of the first document detector 236.

(I-iii) Starting of feeding the document

When the output signal of the first document detector 236 becomes "H" as described above, the signal "H" is fed to an AND gate A2 and a delay circuit D1. Since a flip-flop FF3 is in the reset state at this time, a signal "H" is fed to the AND gate A2 also from the output terminal $\overline{Q}$ of the flip-flop FF3, whereby signal "H" is produced at the output terminal of the AND gate A2. The output signal "H" is fed to an AND gate A3. Furthermore, a signal "H" is also fed to the AND gate A3 from the delay circuit D1 after the lapse of a predetermined delay time set by the delay circuit D1. Thus, the AND gate A3 produces an output signal "H" at its output terminal. This output signal "H" is fed to an AND gate A4 through an OR gate O1. A signal "H" is also fed to the AND gate A4 from the output terminal $\overline{Q}$ of a flip-flop FF4 in the reset state. As a result, a signal "H" is produced at the output terminal of the AND gate A4, and the sidnal "H" is fed to the input terminal CP of a flip-flop FF5. Since the signal "H" showing a normal condition is continuously fed from the main control means of the electrostatic copying apparatus proper (therefore the input signal "H" exists at the input terminal D of a flip-flop FF5), the flip-flop FF5 is set and a signal "H" is produced at its output terminal Q. This signal "H" is fed to an AND gate A5, and a signal "H" is also fed to the AND gate A5 from the output terminal $\overline{Q}$ of the flip-flop FF4 in the reset state. Thus, the signal "H" is produced at the output terminal of the AND gate A5, and this signal "H" is fed to the solenoid 118 to energize it. Upon the energization of the solenoid 118, the follower rollers 104 of the conveying roller unit 98 are held at the operating position as shown in FIG. 7-B whereby the conveying roller unit 98 nips the document 94 and the first document-position regulating member 100 is held at the non-arresting position at which it permits the advancing of the document 94.

Simultaneously, the signal "H" from the output terminal Q of the flip-flop FF5 is also fed to an OR gate 02, and then to an AND gate A6 after the lapse of a predetermined delay time set by a delay circuit D2. Thus, the signal "H" is produced at the output terminal of the AND gate A6 and fed to a drive power supply to energize it. Upon the energization of the drive power supply, the conveying roller unit 98 and the endless conveyer belts 134 are driven to start the feeding of the document 94. Thus, the document 94 is conveyed through the introducing section 54 and the main section 52 of the document conveying passage 50.

(II) From the Starting of the feeding of the document to the stopping of the feeding of the document:

(II-i) Detecting action of the detector 228

When the drive power supply is energized and the driving of the conveying roller unit 98 and the endless conveyer belts 134 is started as above, the optical detector 232 of the detector 228 successively produces pulse signals according to the amount of rotation of the plate 230 of the detector 228 rotating together with the support shaft 108, and feeds these pulse signals to a counter C1 for document feeding and a counter C2 for document discharging, as can be seen from FIG. 5.

(II-ii) Detection of the document being smaller than the specified size, or of a trouble in the manual document positioning operation The counter C1 begins counting at a time when the drive power supply is energized and the feeding of the document 94 is started. Its first output terminal $x_i$ produces an output signal "H" at a time when the conveying roller unit 98 and the endless conveyer belts 134 have been driven by an amount required to transfer the document 94 by a distance corresponding to the minimum size, required for normal feeding, of the document in the conveying direction (for example, when twenty pulse signals have been couted); and feeds the output signal "H" to the input terminal CP of the flip-flop FF2. When at this time, the first document detector 236 is not detecting the document 94 and its output signal returns to "L" for some reason or other (for example, the size of the document 94 in the conveying direction is shorter than the minimum size of the document, or the document 94 which has been manually positioned is manually withdrawn immediately thereafter), the output signal "L" is converted to "H" by the inverter IN2 and fed into the input terminal D of the flip-flop FF2. Thus, the signal "H" is fed to both the input terminal CP and the input terminal D of the flip-flop FF2. The flip-flop FF2 is set and at its output terminal Q, a signal "H" showing the occurrence of document jamming is generated. This signal "H" is fed to the flip-flop FF5 through an OR gate 03 and also to the flip-flop FF6 through an OR gate 04 to clear the flip-flops FF5 and FF6 and deenergize the drive power supply and the solenoid 118 (and the solenoid 176). (When the aforesaid signal showing jamming of the document, or a signal showing document jamming to be described hereinbelow is produced, the solenoids 118 and 176 are deenergized without fail irrespective of whetehr they are in the energized or deenergized state). Simultaneously, the counter C1 for document feeding is cleared. The signal "H" showing the occurrence of document jamming which is produced at the output terminal Q of the flip-flop FF2 is fed to a lamp L2 indicating the occurrence of document jamming to turn it on. At the same time, it is fed as a clearing signal to the main control means of the electrostatic copying apparatus itself to stop the operation of the electrostatic copying apparatus itself.

(II-iii) Deenergization of the solenoid 118

When after the starting of document feeding as in (I-iii), the document 94 continues to advance in a normal condition and the trailing edge of the document 94 goes past the detecting position of the first document detector 236, the first document detector 236 no longer detects the document 94 but produces a signal showing the end of document introduction. Namely, the output signal "H" of the first document detector 236 returns to "L". The signal "L" is converted to "H" by the inverter IN2 and fed to an AND gate A7. Since at this time, a signal "H" is also fed to the AND gate A7 from the output terminal Q of the set flip-flop FF5, signal "H" is produced at the output terminal of the AND gate A7. This signal "H" is fed to the input terminal PR of the flip-flop FF4 to set the flip-flop FF4. In this state, the signal at the output terminal $\bar{Q}$ of the flip-flop FF4 which is to be fed to the AND gate A5 changes from "H" to "L" thereby deenergizing the solenoid 118 and returning the follower rollers 104 of the conveying roller unit 98 to the non-operating position and the first document-position regulating member 100 to the arresting position.

Furthermore, when the output signal of the first document detector 236 returns from "H" to "L", the lamp L1 is again turned on (therefore, showing that the next document is ready for manual positioning).

(II-iv) Detection of jamming of the document before the trailing edge of the document goes past the first document detector 236.

A second output terminal $y_1$ of the document feeding counter C1 for document feeding produces an output signal "H" at a time when the conveying roller unit 98 and the endless conveyer belts 134 have been driven by an amount required to transfer the document 94 by a distance corresponding to the maximum size, in the conveying direction, of the document to be manually positioned (for example, when 55 pulse signals have been counted); and feeds this output signal "H" to an AND gate A8. When the document 94 jams before its trailing edge goes past the detecting position of the first document detector 236 and therefore the first document detector 236 is still detecting the document 94 and thus producing the output signal "H", the flip-flop FF5 is in the set state and producing a signal "H" at its output terminal Q and the flip-flop FF4 is in the reset state and producing a signal "H" at its output terminal $\bar{Q}$. Accordingly, a signal "H" is produced at the output terminal of the AND gate A5, and the signal "H" is fed to the AND gate A8. Hence, the AND gate A8 produces signal "H" at its output terminal, and feeds the signal "H" to the input terminal PR of the flip-flop FF2 through an OR gate 05. As a result, the flip-flop FF2 is set, and a signal showing the occurrence of jamming of the document, that is, the signal "H", is produced at its output terminal Q. When this signal showing the occurrence of document jamming is produced, the operation as described in (II-ii) above is performed.

(II-iv) Production of a signal showing the starting of a copying cycle

A third output terminal $z_1$ of the counter C1 for document feeding produces an output signal "H" at a time when the conveying roller unit 98 and the endless conveyer belts 134 have been driven by an amount sufficient to convey the document 94 to a position from which the leading edge of the document 94 can reach the second document-position regulating member 168 (FIGS. 3, 8 and 10-A held at the arresting position even when the conveying of the document 94 is stopped (for example, when 60 pulse signals have been counted). The output signal "H" is fed to the main control means of the electrostatic copying apparatus itself through an OR gate 06 as a signal showing the starting of a copying cycle. In response to the signal showing the starting of a copying cycle, the required copying cycle by the elctrostatic copying apparatus itself is started (therefore, it is not necessary to operate a start switch PS shown in FIGS. 1 and 2 provided in the electrostatic copying apparatus itself in order to start the required copying cycle).

(II-vi) Stopping of the feeding of the document

A fourth output terminal $a_1$ of the counter $C_1$ for document feeding produces an output signal "H" a a time when the conveying roller unit 98 and the endless conveyer belts 134 have been driven by an amount required to convey the document 94 until its leading edge reaches a position slightly before the second document-position regulating member 168 (FIGS. 3, 8 and 10-A) held at the arresting position (for example, when 63 pulse signals have been counted). The output signal "H" is fed to the flip-flop FF5 through the OR gate 03 to clear the flip-flop FF5 and thus deenergize the drive power supply. Upon the de-energization of the drive power supply, the driving of the conveying roller unit 98 and the endless conveyer belts 134 is stopped and the feeding of the document 94 is stopped. The document 94, however, continues to advance by inertial movement after the stopping of feeding operation and comes to a stop when its leading edge comes into contact with the second document-position regulating member 168 (FIGS. 3, 8 and 10-A).

If desired, instead of deenergizing the drive power supply by the output signal "H" produced by the fourth output terminal $a_1$ of the counter C1, an additional document detector may be disposed at a position slightly before the position at which the second regulating member 168 arrests the advancing of the document 94 so that when this additional detector detects the leading edge of the document 94, the drive power supply may be deenergized in response thereto.

(III) From the Starting of discharging the document to the end of discharging the document:

(III-i) Starting of discharging the document

When the required copying cycle by the electrostatic copying apparatus is started by the aforesaid signal showing the starting of the copying cycle described in (II-v), the main control means of the electrostatic copying apparatus produces a signal "H" showing non-operation. The signal "H" showing non-operation disappears (namely becomes a signal "L" showing the starting of operation) when the number of pulse signals "H" showing the number of copying cycles and produced by the main control means during each copying cycle (for example, at the end of the exposing step) agrees with the predetermined number of copies. The signal "L" is converted to "H" by an inverter IN3 and fed to an AND gate A9. Since the signal "H" showing the number of copying cycles is a pulse signal, it immediately disappears and becomes a signal "L" which is converted to "H" by an inverter IN4 and fed to the AND gate A9. Hence, when the copying cycle has been performed the number of times agreeing with the preset number of copies of the document, the AND gate A9 produces a signal "H" at its output terminal and feeds it to the input terminal CP of the flip-flop FF6.

On the other hand, at this time, the output signal of the first document detector 236 is "L", and the output signal "L" is converted to "H" by the inverter IN2 and fed to the AND gate A7. Simultaneously, the signal "H" from the output terminal Q of the set flip-flop FF5 is also fed to the AND gate A7. Accordingly, signal "H" is produced at the output terminal of the AND gate A7, and this signal "H" is fed to the flip-flop FF4 to set it. Hence, the signal "H" is fed to the input terminal D of the flip-flop FF6 from the output terminal Q of the flip-flop FF4.

Thus, when the signal "H" is fed to the input terminal D of the flip-flop FF6 as described above, the flip-flop FF6 is set and a signal "H" is produced at its terminal Q. The signal "H" is fed to the input terminal CP of the flip-flop FF4 to clear it and also fed to an AND gate A10. A signal "H" from a second output terminal $y_2$ of a document discharging counter C2 to be described below is also fed to the AND gate A10, and therefore, the signal "H" is produced at the output terminal of the AND gate A10. This signal "H" is fed to the solenoid 176 to energize it. When the solenoid 176 is energized, the second document-position regulating member 168 is held at the non-arresting position at which it permits the advancing of the document 94 and the pressing roller 170 is held at the operating position, as shown by two-dotted chain lines in FIG. 10-A.

The signal "H" from the output terminal Q of the set flip-flop FF6 is also fed to the OR gate 02, and therefore, after the lapse of a predetermined delay time set by the delay circuit D2, a signal "H" is produced at the output terminal of the AND gate A6, and this signal "H" is fed to the drive power supply to energize it. As a result, the driving of the endless conveyer belts 134 together with the conveying roller unit 98 is started and the discharging of the document 94 begins. The document 94 passes through the curved discharging section 56 of the document conveying passage 50 from its main section 52 and discharged onto the document receiving surface 46 (FIG. 1).

(III-ii) Starting of counting the counter C2 for document discharging

When the drive power supply is energized in the manner described above, the optical detector 232 of the detector 228 begins to produce pulse signals successively as stated in section (II-i) above. Simultaneously, as a result of the flip-flop FF6 being set, the signal fed from the output terminal $\overline{Q}$ of the flip-flop FF6 to the counter C2 for document discharging becomes "L", whereby the counter C2 begins to count the pulse signal generated by the optical detector 232.

(III-iii) Detection of jamming of the document before the leading edge of the document reaches the second document detector 242

A first output terminal $x_2$ of the counter C2 produces an output signal "H" at a time when the endless conveying belts 134 have been driven by an amount required to transfer the document by a distance sufficient for the leading edge of the document 94 (whose discharging has begun) to reach the detecting position of the second document detector 242 (for example, when 20 pulse signals have been counted); and feeds this output signal "H" to an AND gate A11. When at this time the document 94 jams before its leasing edge reaches the detecting position of the second document detector 242 and therefore the second document detector 242 has not yet detected the document 94, the output signal of the second document detector 242 is "L". This output signal "L" is converted to "H" by an inverter IN5 and fed to the AND gate A11. Accordingly, a signal "H" is produced at the output terminal of the AND gate A11, and this signal "H" is fed to the input terminal PR of the flip-flop FF2 through the OR gate 05. As a result, the flip-flop FF2 is set, and a signal "H" showing the occurrence of document jamming is produced at its output terminal Q. When this signal showing the occurrence of document jamming is produced, the operation as described in (II-ii) above is performed.

(III-iv) De-energization of the solenoid 176

The second output terminal $y_2$ of the counter C2 normally produces a signal "H". But this signal "H" is changed to "L" when the endless conveyer bets 134 have been driven by an amount required to transfer the document (whose discharging has been started), by a distance corresponding to the maximum size of the document in the conveying direction (for example, when 55 pulse signals have been counted). When the signal of the second output terminal $y_2$ of the counter C2 becomes "L", the solenoid 176 is denergized, with the result that as shown by full lines in FIG. 10-A, the second document-position regulating member 168 is returned to the arresting position and the pressing roller 170 is returned to the non-operating position.

(III-v) Stopping of discharging the document

A third output terminal $\alpha_2$ of the counter C2 for document discharging produces a signal "H" at a time when the endless conveyer belts 134 have been driven by an amount which enables the document 94, of which discahrging has been started, to be fully discharged onto the document receiving surface 46 even when the document 94 has the maximum size in the conveying direction (for example, when 130 pulse signals have been counted). This output signal "H" is fed to the flip-flop FF6 through the OR gate 04 to clear the flip-flop FF6. As a result, the signal at the output terminal Q of the flip-flop FF6 becomes "L" to deenergize the drive power supply and stop the driving of the endless conveyer belts 134 together with the conveying roller unit 98.

(III-vi) Detection of jamming of the document before the trailing edge of the document goes past the second document detector 242

When the third output terminal $\alpha_2$ of the counter C2 for document discharging has produced the above output signal "H" but the second detector 242 is still detecting the document 94 and thus producing the output signal "H" owing to the jamming of the document 94 before its trailing edge goes past the detecting position of the second document detector 242 (in other words, the trailing edge of the document 94 has not yet been detected), this output signal "H" is still being fed to an AND gate A12. On the other hand, when the flip-flop FF6 is cleared as shown in (III-v) above by the output signal "H" produced by the third output terminal $\alpha_2$ of the counter C2, an output signal "H" is produced at the output terminal $\overline{Q}$ of the flip-flop FF6. As a result, the counter C2 is cleared and the output signal "H" is fed to the AND gate A12, whereby a signal "H" is produced at the output terminal of the AND gate A12. This signal "H" is fed to the flip-flop FF2 through the OR gate 05 to set the flip-flop FF2, and a signal "H" showing the occurrence of document jamming is produced at the output terminal Q of the flip-flop FF2. When this signal showing the occurrence of document jamming is produced, the operation as described in (II-ii) is performed.

(IV) When the next document is manually positioned before the dischargang of the document has begun:

As stated in (II-iv) above, when the trailing edge of the document 94 goes past the detecting position of the first document detector 236, the output signal of the detector 236 becomes "L". However, when the next document 94 is manually positioned at the required site before the discharging of the document 94 is started as described in (III-i) above, the output signal of the first document detector 236 again becomes "H" as stated in (I-ii) above. This output signal "H" is fed to the flip-flop FF3. When in this state, the main control means of the electrostatic copying apparatus prodeces a signal "L" showing the starting of operation by the performance of copying through the number of cycles corresponding with the preset number of copies of the previous document 94, this signal "L" is converted to "H" by the inverter IN3 and fed to the input terminal CP of the flip-flop FF3. Thus, the flip-flop FF3 is set, and a signal "H" is produced at its output terminal Q. The signal "H" produced at the output terminal Q of the flip-flop FF3 is fed to the AND gate A4 through the OR gate O1. Furthermore, when the signal "L" showing the starting of the operation is produced, the flip-flop FF4 is cleared as stated in (III-i) above, and therefore a signal "H" is produced at the output terminal $\overline{Q}$ of the flip-flop FF4. This signal "H" is also fed to the AND gate A4. Hence, signal "H" is produced at the output terminal of the AND gate A4 and fed to the input terminal CP of the flip-flop FF5 to set the flip-flop FF5. As a result, the feeding of the next document 94 is started as stated in (I-iii) above, and subsequent to this, substantially the same procedure as described above with respect to the previous document 94 is performed.

On the other hand, the signal "H" produced at the outut terminal Q of the flip-flop FF3 is also fed to an AND gate A13. A signal "H" is also fed to AND gate A13 from the output terminal $\overline{Q}$ of the flip-flop FF1 in the reset state. Hence, signal "H" is generated at the output terminal of the AND gate A13, and fed as a signal showing the starting of the copying cycle to the main control means of the electrostatic copying apparatus through the OR gate O6. Accordingly, the copying cycle for the next document 94 by the electrostatic copying apparatus is started at this time. If desired, however, the copying cycle for the next document 94 by the electrostatic copying apparatus may also be started, as in the case of the previous document 94, by the output signal "H" produced by the third output terminal $z_1$ of the counter C1 for document feeding.

(V) Handling of a document which has jammed:

When the signal showing the occurrence of document jamming as described above is produced, the main frame structure 12 is lifted from its operating position toward its non-operating position, or the closure member 76 (FIGS. 3, 5, 6 and 7-A) is brought to at the opened position, and a document which has jammed is taken out. When the main frame structure 12 is lifted from its operating position toward its non-operating position, or the closure member 76 is brought to the opened position, the detector 254 for detecting the position of the main frame structure 12 assumes the second condition, i.e. the closed condition, and its output signal becomes "H". Thus, the signal showing the occurrence of document jamming as described above is cleared.

(VI) When a document is to be placed manually on the transparent plate:

When a document to be copied is positioned manually on the transparent plate 8 without utilizing the semi-automatic document feeding and discharging device 6 (for example, the document to be copied is a thick one such as a book or the one having a relatively high rigidity such as a thick paper or a metal plate), the operator should hold the main frame structure 12 at the non-operating position shown in FIG. 2. In this state, the detector 254 for detecting the position of the main frame structure 12 assumes the second condition, i.e. the closed condition, and its output signal becomes "H". This signal "H" is fed to the input terminal CL of the flip-flop FF1 to clear the flip-flop FF1. A signal "L" is fed to a NAND gate N1 from the output terminal Q of the flip-flop FF4 in the reset state, and a signal "L" is also fed to it from the output end of the OR gate O6. Thus, a signal "H" is produced at the output terminal of the NAND gate N1. This signal "H" is fed to the input terminal D of the cleared flip-flop FF1.

Then, the operator manually positions the document at the desired site on the transparent plate 8, and turnes the document holding member 5 of the document holding device 4 to the operating position shown in FIG. 2. The operator then depresses the start switch PS (FIGS. 1 and 2) procided in the electrostatic copying apparatus to start the copying cycle by the electrostatic copying apparatus proper. As a result, the main control means of the electrostatic copying apparatus produces a signal "H" showing non-operation. This signal "H" is fed into the input terminal CP of the flip-flop FF1 to set the flip-flop FF1. Hence, a signal "H" is produced at the output terminal Q of the flip-flop FF1, whereby a lamp L3 is turned on showing the presence of the document placed on the transparent plate 8 by a manual operation. The signal "H" produced at the output terminal Q of the flip-flop FF1 is also fed to the input terminal CL of the flip-flop FF5 through the OR gate O3 to reset the flip-flop FF5. Accordingly, even when another document is manually positioned on the semi-automatic document feeding and discharging device 6, the solenoid 118 and the drive power supply are not energized. The lamp L3 is turned off when the flip-flop FF1 is reset by returning the main frame structure 12 again to the operating position shown in FIG. 1.

Document-Holding Device

The construction of the illustrated document holding device 4 in accordance with this invention is described below in detail.

Again, with reference to FIGS. 1 and 2, the document holding device 4 includes the aforesaid document holding member 5 and a mounting mechanism 316 for mounting the document holding member 5 in position. As FIG. 1 clearly shows, two mounting mechanisms 316 spaced from each other in the direction of the pivot axis of the document holding member 5 anre disposed in the illustrated embodiment.

The document holding member 5 may be of any desired form which can cover the transparent plate 8 and an original document placed thereon at the aforesaid closed position. In the illustrated embodiment, it has a relatively rigid box-like frame member 318 formed of a suitable material such as a synthetic resin with its under side facing the transparent plate 8 being opened at the aforesaid closed position. An elastic member 320 formed of a suitable elastic material such as a sponge material is bonded to the inside surface of the frame member 318. Conveniently, a thin white sheet 322 made of a suitable plastic material such as a vinyl chloride resin or a urethan resin is attached to the exposed surface of the elastic member 320, namely that surface of the elastic member 320 which faces the transparent plate 8 at the aforesaid closed position. A gripping portion 324 which can be handled in opening or closing the document holding member 5 is formed at the free end of the frame member 318.

The mounting mechanisms 316 are described in detail with reference to FIGS. 12, 13-A, 13-B, 14-A, 14-B and 15. As FIG. 12 clearly shows, each of the illustrated mounting mechanisms 316 has a support member 326, a linking member 328 and an intermediate member 330. The support member 326 has a pair of spaced side walls 322a and 332b, and three pins 334, 336 and 338 are mounted between the pair of side walls 332a and 332b. As will be appreciated from the following description, the axis of the pin 334 defines the pivot axis of the document holding member 5. A pair of leg portions 340a and 340b spaced from each other and extending downwardly in substantially parallel relationship to each other are formed in one side wall 332a as a one-piece unit. It is critical that the support member 326 should be mounted on a supporting base portion 342 located adjacent to one side edge of the transparent plate 8 in such a way that it is free to move upwardly and downwardly and oscillate in the direction of the pivot axis of the document holding member 5 (therefore, in the direction of the axis of the pin 334). Since in the illustrated embodiment, the transparent plate 8 directly disposed on the top side of the housing 2 of the copying apparatus, the supporting base portion 342 on which to mount the support member 326 is defined by the top side itself of the housing 2. The document holding device 4 improved in accordance with this invention, however, is also applicable to a so-called document moving and scanning exposure type electrostatic copying apparatus in which a movable frame structure is provided slidably on the top surface of the housing 2 and a transparent plate is disposed on the movable frame structure. In this case, the support member 326 of the mounting mechanism 316 is mounted on the movable frame structure (and therefore, the movable frame structure defines the aforesaid supporting base portion).

The manner of mounting the support member 326 on the support base portion 342 is described below. An opening 346 of a desired shape is formed at a substantially horizontal top side 344 of an upper wall defining the top side of the housing 2. Correspondingly to the position of the opening 346, a mounting unit 350 utilized to mount the support member 326 as required is fixed to an upstanding plate 348 provided within the housing 2. The mounting unit 350 has a main portion 352 disposed substantially perpendicularly, and a pair of support shafts 354a and 354b spaced from each other a predetermined distance are fixed in the main portion 352. Guide rollers 358a and 358b having flanges 356 at both sides are rotatably mounted respectively on the free ends of the support shafts 354a and 354b. The mounting unit 350 further has a projecting portion 360 projecting horizontally from the upper edge of the main portion 352 and located below the opening 346 and a hanging portion 362 suspended from the projecting end of the projecting portion 360. As clearly shown in FIGS. 13-B, 14-B and 15, a circular opening 364 is formed in the projecting portion 360, and a linking piece 366 having a conically shaped part is inserted in the opening 364. A downwardly biasing spring member 370 for elastically biasing the linking piece 366 downwardly is interposed between the linking piece 366 and a projecting portion 368 projecting from the lower edge of the main portion 352. As shown in FIG. 12, the opposite side portions of the projecting end of the projecting portion 360 are cut away to form shoulders 372a and 372b respectively, and guide grooves 374a and 374b are defined between these shoulders 372a and 372b and the banding portion 362.

As illustrated in FIG. 13-A, the pair of leg portions 340a and 340b of the support member 326 are inserted into the mounting unit 350 through the guide grooves 374a and 374b respectively and through the space between the flanges 356 of the guide rollers 358a and 358b. In addition, as illustrated in FIGS. 13-B, 14-B and 15, the support member 326 is fixed to the linking piece 366 by screwing a setscrew 378 extending through a bottom wall 376 of the support member 326 into a threaded hole 380 (FIG. 12) formed in the linking piece 366. Since the linking piece 366 of the support member 326 so mounted is free to move upwardly and downwardly with respect to the projecting portion 360 of the mounting unit 350, the support member 326 is movable upwardly and downwardly with respect to the mounting unit 350 and, therefore, with respect to the supporting base portion 342. Furthermore, since the linking piece 366 is elastically biased downwardly by the downwardly biasing spring member 370, the support member 326 is elastically biased downwardly by the spring member 370 with respect to the mounting unit 350, and, therefore, with respect to the supporting base portion 342. When the support member 326 is lefted from its lowermost position illustrated in FIGS. 13-A, 13-B, 14-A, 14-B and 15 as stated hereinbelow, the guide grooves 374a and 374b and the flanges 356 of the guide rollers 358a and 358b guide the rising movement of the leg portions 340a and 340b of the support member 326. In addition, since the linking piece 366 is free to tilt with respect to the projecting portion 360 of the mounting unit 350 in any desired direction and the width of each of the guide grooves 374a and 374b (i.e., the size of each of these guide grooves in the direction of the axis of the pin 334) and the distance between the flanges 356 in each of the guide rollers 358a and 358b is set larger than the thickness of each of the leg portions 340a and 340b of the support member 326, the support member 326 is free to oscillate over a predetermined range with respect to the mounting unit 350 and, therefore, with respect to the supporting base portion 342 in the direction of the axis of the pin 334, i.e. in the direction of the pivot axis of the document holding member 5, as will be described below with reference to FIG. 16. The range of the oscillation of the support member 326 is defined by the width of each of the guide grooves 374a and 374b and the spacing between the flanges 356 of each of the guide rollers 358a and 358b. It will be appreciated therefore that the support member 326 of the mounting mechanism 316 is mounted on the supporting base portion 342 in such a manner that it is free to move upwardly and downwardly and to oscillate in the direction of the pivot axis of the document holding member 5.

Figure 12:
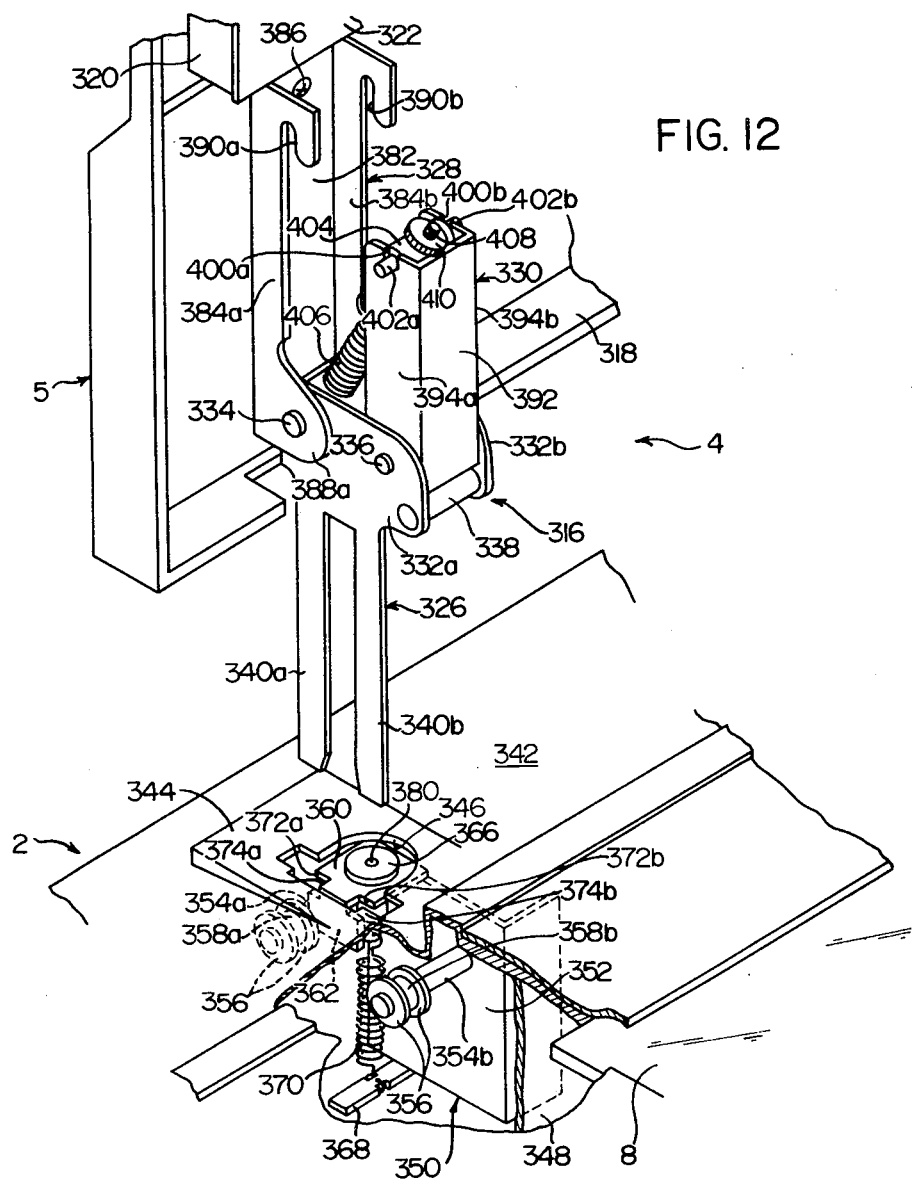
FIG. 12 is an exploded perspective view showing a mounting mechanism for the document holding device shown in FIG. 1, and its related parts.

As is seen from FIG. 12, the linking member 328 of the mounting mechanism 316 has a bottom wall 382 and a pair of side walls 384a and 384b upstanding from the bottom wall 382. The linking member 328 is fixed to a predetermined position of the document holding member 5 by a setscrew 386 threadably received in the frame member 318 of the document holding member 5 through a bottom wall 382 of the linking member 328. Projecting portions 388a and 388b are formed respectively at one end portions of the side walls 384a and 384b of the linking member 328, and are rotatably mounted on the pin 334 mounted on the support member 326. Thus, the linking member 328 is pivotally mounted on the support member 326 and, therefore, the document holding member 5 is pivotally mounted on the support member 326 through the linking member 328. Elongated slots 390a and 390b having one open end (these slots will be described further hereinbelow) are formed at the other end portions of the side walls 384a and 384b of the linking member 328 respectively. If desired, the aforesaid linking member 328 may be formed with the frame member 318 of the document holding member 5 as a one-piece structure. Alternatively, the frame member 318 of the document holding member 5 may be directly mounted pivotally on the support member 326 while omitting the linking member 328.

Figure 15:
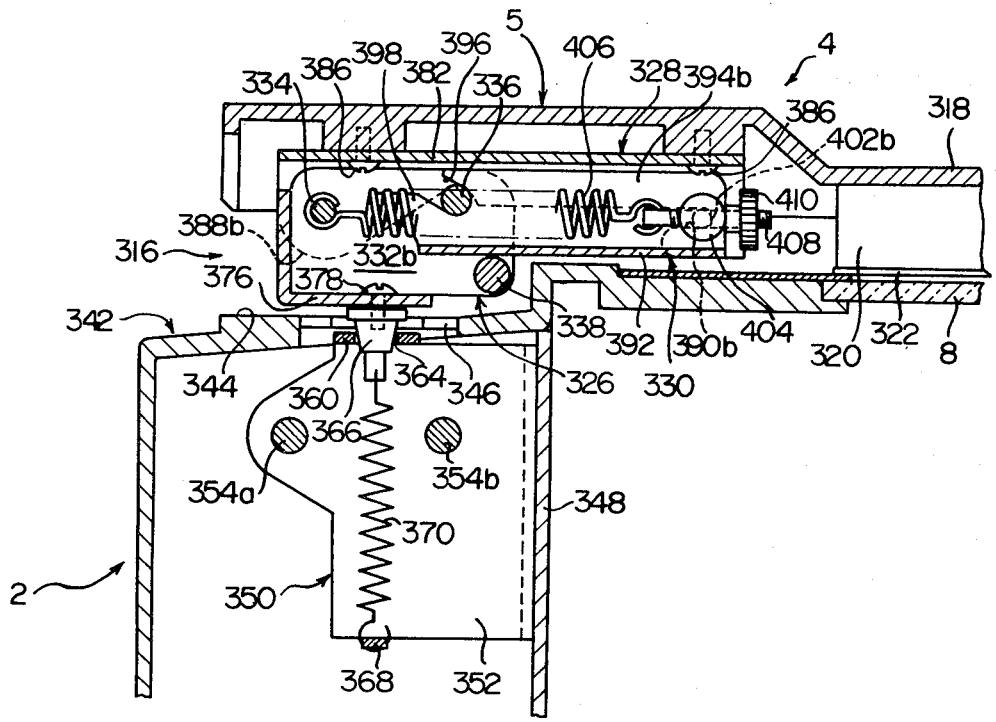
FIG. 15 is a sectional view showing the mounting mechanism of the document holding device shown in FIG. 1, and its related parts, in the state in which the document holding member is at its closed position.

The intermediate member 330 of the mounting mechanism 316 has a bottom wall 392 and a pair of side walls 394a and 394b upstanding from the bottom wall 392. Slots 396 having one open end are formed respectively in one end portions of the side walls 394a and 394b as illustrated in FIGS. 13-B, 14-B and 15 (the drawings show only a slot 396 formed in the side wall 394b). By inserting the pin 336 mounted on the support member 326 in the slots 396, the intermediate member 330 is mounted on the support member 326 in such a manner that it is free to turn between a first angular position shown in FIG. 15 and a second angular position shown in FIGS. 12, 13-A, 13-B, 14-A and 14-B. At the first angular position shown in FIG. 15, the outside surface of the bottom wall 392 of the intermediate member 330 abuts against the pin 338 mounted on the support member 326, whereby the turning of the intermediate member 330 in the clockwise direction in FIG. 15 is restricted. At the second angular position shown in FIGS. 12, 13-A, 13-B, 14-A and 14-B, projecting portions 398 formed at one end portions of the side walls 394a and 394b of the intermediate member 330 (only a projecting portion 398 formed in the side wall 394b is shown in the drawings) abut against the pin 338 mounted on the support member 326 as clearly shown in FIGS. 13-B and 14-B, whereby the turning of the intermediate member 330 in the counterclockwise direction in FIGS. 13-B and 14-B is restricted. Slots 400a and 400b being open at the other end are formed at the other end portions of the side walls 394a and 394b of the intermediate member 330 respectively. Between these slots 400a and 400b is mounted a rod 404 having fixed in the opposite end portions thereof pins 402a and 402b projecting through the slots 400a and 400b (as will be described below these pins 402a and 402b cooperate with the slots 390a and 390b formed in the linking member 328). A pivoting-biasing spring member 406 is stretched between the rod 404 mounted on the intermediate member 330 and the pin 334 mounted on the support member 326. The rod 404 is connected to one end of the pivoting-biasing spring member 406 by screwing a screw member 408 into a threaded hole formed in the rod 404 and linking the aforesaid one end of the spring member 406 to one end portion of the screw member 408. The other end portion of the screw member 408 has an adjusting piece 410 threadably received thereabout, and by operating the adjusting piece 410, the degree of screwing of the screw member 408 with respect to the rod 404, and therefore, the tension of the pivoting-biasing spring member 406, can be adjusted. It will be easily appreciated by comparing FIGS. 13-B, 14-B and 15 that the pivoting-biasing spring member 406 is disposed such that when the intermediate member 330 is moved to a predetermined angular position which is between the first angular position shown in FIG. 15 and the second angular position shown in FIGS. 13-B and 14-B, the opposite ends of the spring member 406 are located in alignment with the pivot axis of the intermediate member 330, and therefore with the axis of pin 336, and thus, the spring 406 is in the most stretched state. Accordingly, when the intermediate member 330 moves toward the first angular position from the aforesaid predetermined angular position, the pivoting-biasing spring member 406 elastically biases the intermediate member 330 to the first angular position clockwise in FIG. 15. Conversely, when the intermediate member 330 moves toward the second angular position from the aforesaid predetermined angular position, the pivoting-biasing spring member 406 elastically biases the intermediate member 330 to the second angular position counterclockwise in FIGS. 13-B and 14-B.

The operation of the document holding device 4 described hereinabove is now described. When the document holding member 5 is held at a totally opened position (i.e., the position shown in FIGS. 1, 13-A and 13-B) which is dislaced about 90 degrees in the opening direction from a closed position (i.e., the position shown in FIGS. 2 and 15), a part of the frame member 318 of the document holding member 5 (more specifically the outside surface of the rear side edge of the frame member 318) is in abutment against the substantially horizontal top side 344 formed in the supporting base portion 342. Thus, the document holding device 5 is prevented from further turning counterclockwise in FIG. 13-B and is held at the totally opened position. Of course, it is possible to prevent the further counterclockwise turning of the document holding device 5 and hold it at the totally opened position by causing a suitable side of the document holding member 5 to abut against a suitable site of the supporting member 326 of the mounting mechanism 316, or causing a suitable site of the linking member 328 of the mounting mechanism 316 to abut against a suitable site of the supporting base portion 342 or a suitable site of the supporting member 326 of the mounting mechanism 316, instead of bringing a part of the document holding member 5 into abutment with the top side 344 of the supporting base portion 342. When the document holding member 5 is at the wholly opened position, the intermediate member 330 of the mounting mechanism 316 is held at the second angular position by the elastic biasing action of the pivoting-biasing spring member 406, as shown in FIGS. 13-A and 13-B.

When the document holding member 5 is truned in the closing direction (i.e., clockwise in FIGS. 13-B and 14-B) from the aforesaid totally opened position to a half-opened position shown in FIGS. 14-A and 14-B, the free ends of the side walls 384a and 384b of the linking member 328 fixed to the document holding member 5 abut against the pins 402a and 402b provided in the intermediate member 330 and the pins 402a and 402b are positioned at the open ends of the slots 390a and 390b formed in the side walls 384a and 384b, as shown in FIGS. 14-A and 14-B. In the above state illustrated in FIGS. 14-A and 14-B, the linking member 328 fixed to the document holding member 5 abuts against the intermediate member 330 held in the second angular position by the elastic biasing action of the pivoting-biasing spring member 406; thus, the document holding member 5 is held at the position shown in FIGS. 14-A and 14-B, i.e. the half-opened position. Conveniently, this half-opened position of the document holding member 5 is displaced from the closed position shown in FIG. 2 by an angle of, for example, about 60 degrees.

When the document holding member 5 is further turned in the closing direction (i.e., clockwise in FIG. 14-B) from the half-opened position shown in FIGS. 14-A and 14-B, the linking member 328 fixed to it abuts against the intermediate member 330 and exerts a force on it. Thus, incident to the turning of the document holding member 5 in the closing direction, the intermediate member 330 is also turned clockwise in FIG. 14-B against the elastic biasing action of the pivoting-biasing spring member 406. In response to this turning movement, the pins 402a and 402b disposed in the intermediate member 330 respectively advance into, and slide through, the slots 390a and 390b formed in the side walls 384a and 384b of the linking member 328. Thus, by the advancing of the pins 402a and 402b into the slots 390a and 390b, the linking member 328 and the intermediate member 330 are brought into engagement with each other. When the document holding member 5 is held at the closed position shown in FIG. 15 and by two-dotted chain lines in FIG. 14-A, the intermediate member 330 is brought to the first angular position shown in FIG. 15 and by two-dotted chain lines in FIG. 14-A, and, therefore, is held at the aforesaid first angular position by the elastic biasing action of the pivoting-biasing spring member 406. The document holding member 5 is also surely held at the aforesaid closed position by the elastic biasing action of the spring 406 through the intermediate member 330 because the linking member 328 is in engagement with the intermediate member 330 by the slits 390a and 390b and the pins 402a and 402b.

Now, let us assume that the document holding member 5 is turned in the opening direction (i.e., counterclockwise in FIG. 15) from the closed position shown in FIG. 15 and by two-dotted chain lines in FIG. 14-A. Until the document holding member 5 is turned to the half-opened position shown in FIGS. 14-A and 14-B, the linking member 328 and the intermediate member 330 are held in engagement with each other through the slots 390a and 390b and the pins 402a and 402b. Thus, incident to the turning of the document holding member 5 in the opening direction, the intermediate member 330 is turned counterclockwise in FIG. 15. Accordingly, the pins 402a and 402b slide through the slots 390a and 390b toward the open ends of these slots. When the document holding member 5 has been brought to the half-opened position, the intermediate member 330 reaches the second angular position and is held there by the elastic biasing action of the pivoting-biasing spring member 406, and the pins 402a and 402b are located at the open ends of the slots 390a and 390b.

When the document holding member 5 is further turned in the opening direction (i.e., counterclockwise in FIG. 14-B) from the half-opened position shown in FIGS. 14-A and 14-B to the totally opened position shown in FIGS. 13-A and 13-B, the pins 402a and 402b come out of engagement with the slots 390a and 390b and the linking member 328 comes out of engagement with the intermediate member 330. Hence, only the document holding member 5 and the linking member 328 fixed thereto are turned in the opening direction, and the intermediate member 330 is held at the second angular position shown in FIGS. 14-A and 14-B.

As shown in FIGS. 1 and 2, in an electrostatic copying apparatus having both the document holding device 4 and the semi-automatic document feeding and discharging device 6 having the above-described structures and functions on the top of the housing 2, the device 4 or 6 is selectively utilized depending upon the properties, etc. of a document to be copied. When the document is in the form of a thin sheet, the semi-automatic document feeding and discharging device 6 is used. In this case, the document holding member 5 of the document holding device 4 is held at the totally opened position shown in FIG. 1 in order to enable the movable main frame structure 12 of the semi-automatic feeding and idscharging device 6 to be held at its operating position. Thus, the movable main frame structure 12 of the semi-automatic document feeding and discahrging device 6 is held at its operating position shown in FIG. 1. On the other hand, when the document is a relatively thick one such as a book, and is not suitable for the mode in which the device 6 is used, the document holding device 4 is utilized. In this case, the movable main frame structure 12 of the semi-automatic device 6 is held at its non-operating position shown in FIG. 2, and the document holding member 5 of the document holding device 4 is opened and closed according to the positioning of the document on the transparent plate 8 and the removal of the document from the transparent plate 8. In this mode, the document holding member 5 may be closed and opened between the closed position shown in FIG. 2 and the half-opened position shown in FIGS. 14-A and 14-B, instead of moving it between the closed position shown in FIG. 2 and the opened position shown in FIG. 1.

Since in the improved document holding device 4 in accordance with this invention, the support member 326 of the mounting mechanism 316 described above is mounted on the supporting base portion 342 such that it is free to move upwardly and downwardly and to oscillate in the direction of the pivot axis (i.e., the axis of the pin 334) of the document holding member 5, it achieves the following excellent result especially when a document to be copied is a relatively thick one such as a book. When a relatively thick document as shown in FIG. 16 is placed on the transparent plate 8 and the document holding member 5 is brought to the closed position, the support member 326 of the mounting mechanism 316 is lifted according to the thickness of the document by the elastic biasing action of the downwardly biasing spring member 370, as shown on the right side of FIG. 16, and therefore, the rear end of the document holding member 5 is lifted. Accordingly, even when the document is relatively thick, the document holding member 5 can maintain a substantially parallel state or, as required, a forwardly tilted state with respect to the transparent plate 8 instead of a forwardly and upwardly inclined state, and thus can fully uniformly cover the document according to its thickness or changes in its thickness in the direction perpendicular to the sheet surface in FIG. 16. In addition, when the thickness of the document on the transparent plate 8 varies considerably in the direction of the pivot axis of the document holding member 5, namely in the left-and-right direction in FIG. 16, as shown in FIG. 16, the document holding member 5 can properly tilt in the direction of its pivot axis according to changes in the thickness of the document. Accordingly, the document holding member 5 can fully uniformly cover the document according to its thickness and changes in its thickness even in the aforesaid direction of the pivot axis. Accordingly, the document holding device 4 improved in accordance with this invention can fully uniformly cover the document to conceal it completely and press it against the transparent plate 8 even when the document is relatively thick with considerable variations in thickness.

Whilst the present invention has been described hereinabove with reference to the preferred embodiments taken in conjunction with the accompanying drawings, it should be understood that the invention is not limited to these specific embodiments alone, and various changes and modifications are possible without departing from the scope of the invention.

What we claim is:

1. A device for semi-automatically feeding and discharging a document to be copied in an electrostatic copying apparatus of the type including a housing having on top thereof a transparent plate for placing thereon a document to be copied and including main control means for initiating operation of the copying apparatus and generating a signal indicative thereof, said device comprising:

a main frame structure including means mounting said main frame structure for free turning about an axis extending along one side edge of the transparent plate between an operating position in which said main frame structure covers the transparent plate and a non-operating position in which said main frame structure uncovers the transparent plate;

means defining a document conveying passage including a main section between the underside of said main frame structure and the transparent plate when said main frame structure is in the operating position, an introducing section upstream of the main section, a curve discharging section, and a document receiving surface on the upperside of said main frame structure;

means for conveying a document through the document conveying passage;

a first regulating member for regulating the position of the document, said first regulating member being adapted for selective movement between an arresting position in which said first regulating member projects into the introducing section of the document conveying passage to arrest the advancing of the document therealong and a non-arresting position in which said first regulating member recedes from the introducing section of the document conveying passage to permit the advancing of the document therealong;

a second regulating member for regulating the position of the document, said second regulating member being adapted for selective movement between an arresting position in which said second regulating member projects into that part of the main section of the document conveying passage adjacent the downstream end thereof to arrest the advancing of the document and a nonarresting position in which said second regulating member recedes from the last-named part of the main section on the document conveying passage to permit the advancing of the document;

a first document detector for detecting a document at a position upstream of that position in the introducing section of the document conveying passage at which the first regulating member arrests the advancing of the document, said first document detector producing a signal when at least the leading portion of a document is inserted into the introducing section of the document conveying passage, with the leading edge of the document contacting or approaching the first regulating member, to show the completion of the manual positioning of the document;

means responsive to the first document detector signal for bringing said first regulating member from the arresting position thereof to the non-arresting position thereof and for starting the operation of the document conveying mechanism, thereby conveying the document through the introducing section and the main section of the document conveying passage;

means for monitoring the amount of operation of said document conveying means;

means responsive to said document conveying means having been operated by a predetermined amount for stopping the operation of the document conveying means and for activating said second regulating member to arrest advancing of the document beyond said second regulating member;

means responsive to the signal from the electrostatic copying apparatus main control means for moving the second regulating member from the arresting position thereof to the nonarresting position thereof and for re-initiating the operation of the document conveying means, thereby discharging the document through the curved discharging section of the document conveying passage onto the document receiving surface;

first document jamming detecting means operative after said document conveying means has been operated a relatively small predetermined amount subsequent to the initiating of the operation thereof by the first document detector signal and responsive to said first document detector no longer detecting a document because the size in the conveying direction of the document is shorter than a predetermined length or the document is manually withdrawn immediately after the manual positioning thereof, for producing a document jamming signal and for stopping the operation of said document conveying means;

a further detector for generating a signal indicative of the position of said main frame structure; and means responsive to the presence of a signal from said further detector indicating said main frame structure is in the non-operating position, for making said document conveying means inoperative, and responsive to the combined presence of the document jamming signal and a signal from said further detector indicating said main frame structure is in the operating position, for terminating the document jamming signal when the signal from said further detector changes to indicate said main frame structure is in the non-operating position.

2. The device of claim 1 further comprising means responsive to the signal from the first document detector for moving the first regulating member from the arresting position thereof to the non-arresting position thereof after the lapse of a predetermined delay time from the production of the last-named signal, and for initiating operation of the document conveying means after the further lapse of a predetermined delay time.

3. The device of claim 1 further comprising means responsive to the trailing edge of a document moving past said first document detector for producing a signal showing the completion of introducing of the document, and means for applying the last-named signal to said first regulating member for moving said first regulating member from the non-arresting position thereof to the arresting position thereof.

4. The device of claim 3 further comprising second document jamming detection means responsive to simultaneous (a) operation of the document conveying means by a predetermined amount subsequent to the starting of operation thereof by the first document detector signal, and, (b) absence of the signal showing the completion of introducing of the document, to indicate jamming of the manually positioned document during its advancing past the detecting position of the first document detector.

5. The device of claim 1 further comprising means responsive to the operation of the document conveying means by a predetermined amount for applying a signal to the main control means of the electrostatic copying apparatus to initiate the copying cycle by the electrostatic copying apparatus.

6. The device of claim 1 further comprising means responsive to operation of said document conveying means by a predetermined amount following re-initiation of such operation by the signal from the electrostatic copying apparatus main control means for moving the second regulating member from the non-arresting position thereof to the arresting position thereof.

7. The device of claim 1 further comprising means responsive to operation of said document conveying means by a predetermined amount following re-initiation of such operation by the signal from the electrostatic copying apparatus main control means for stopping the operation of the document conveying means.

8. The device of claim 1 further comprising means responsive to the simultaneous presence of a signal from the main control means of the electrostatic copying apparatus showing the starting of operation of the electrostatic copying apparatus, the first document detector signal showing insertion of at least the leading portion of the next document into the introducing section of the document conveying passage with the leading edge of such next document contacting or approaching the first regulating member held at the arresting position thereof, and a signal from the main control means of the electrostatic copying apparatus showing non-operation of the electrostatic copying apparatus for moving said first regulating member from the arresting position thereof to the non-arresting position thereof for initiating the operation of the document conveying means, whereby the next document is conveyed through the introducing section and the main section of the document conveying passage.

9. The device of claim 1 further comprising a second document detector for generating a signal indicative of a document in the curved discharging section of the document conveying passage and a further document jamming detecting means responsive to simultaneous (a) operation of the document conveying means by a predetermined amount subsequent to the reinitiation of operation thereof due to the signal from the electrostatic copying apparatus main control means, and (b) absence of the second document detector signal, to indicate the jamming of a document because the document jams before it reaches the detecting position of the second document detector.

10. The device of claim 1 further comprising a second document detector for for generating a signal indicative of a document in the curved discharging section of the document conveying passage and a further document jamming detecting means responsive to simultaneous (a)

operation of the document conveying means by a predetermined amount subsequent to the re-initiation of operation thereof due to the signal from the electrostatic copying apparatus main control means, and (b) presence of the second document detector signal, to indicate jamming of a document because the document jams during its advancing past the detecting position of the second document detector.

11. The device of claim 1 further comprising means for opening at least the downstream portion of the introducing section of the document conveying passage to permit removal and disposing of a jamming document, and means responsive to the opening of said at least the downstream portion of said introducing section while the main frame structure is at the operating position thereof, for causing said further detector to generate a signal indicating said main frame structure is in the non-operating position thereof in spite of the fact that the main frame structure itself is in the operating position.

12. The device of claim 1 wherein at least a part of the top side of the main frame structure comprises an upper plate defining the document receiving surface, said device further comprising a restricting member adjustably mounted on said upper plate for restricting the leading edge of a document discharged onto the document receiving surface from the curved discharging section of the document conveying passage.

13. The device of claim 1 wherein said restricting member is at least partly formed of a permanent magnet and is mounted on the top of the upper plate by the magnetic attracting force of the permanent magnet.

14. The device of claim 1 further comprising a stationary support frame member mounted on the top of the housing of the copying apparatus adjacent to the one side edge of the transparent plate; and means mounting said main frame structure pivotally at one end portion thereof on said support frame member, and in which said defining means defines the introducing section of the document conveying passage in said support frame member.

15. The device of claim 14 further comprising a document stand defining a manual document positioning a guide surface annexed to said support frame member, the downstream end of said document stand joining the upstream end of the introducing section of the document conveying passage.

16. The device of claim 14 in which said defining means defines the curved discharging section of the document conveying passage in the other end of the main frame structure.

17. The device of claim 14 wherein said document conveying mechanism includes: at least one endless conveyor belt having operating running sections passing through the main section and the curved discharging section respectively of the document conveying passage, a conveying roller unit comprising a pair of rollers facing each other and disposed upstream of the position at which the first regulating member in the introducing section of the document conveying passage arrests the advancing of the document, said conveying roller unit being adapted to be selectively positioned at an operating position at which the peripheral surface of one roller contacts or approaches the peripheral surface of the other roller and a non-operating position at which at least one roller moves from said operating position away from the other roller, a pressing roller selectively positioned between an operating position at which said pressing roller presses the back of the endless conveyor belt upstream of the position at which the second regulating member in the main section of the document conveying passage arrests the advancing of the document and thus causes the surface of the endless conveyor belt to contact or approach the transparent plate, and a non-operating position at which said pressing roller moves out of pressing contact with the back of the endless belt, and at least one document discharging roller selectively positioned at an operating position at which said document discharging roller contacts or approaches the surface of the endless conveyor belt in the curved discharging section of the document conveying passage or a non-operating position at which said document discharging roller moves away from the surface of the endless belt.

18. The device of claim 17 wherein at least one roller of said pair of rollers in the conveying roller unit and the first regulating member are formed to move as a unit; and the conveying roller unit is responsive to the first regulating member being held at the arresting position thereof to be held at the non-operating position thereof, and responsive to the first regulating member being held at the non-arresting position thereof to be held at the operating position thereof.

19. The device of claim 17 wherein said pressing roller and said second regulating member are formed to move as a unit; and the pressing roller unit is responsive to the second regulating member being held at the arresting position thereof to be held at the non-operating position thereof, and responsive to the second regulating member being held at the non-arresting position thereof to be held at the operating position thereof.

20. The device of claim 17 further comprising a pressing spring member responsive to the main frame structure being at the operating position thereof for elastically biasing the document discharging roller to the operating position thereof; and a separating spring member responsive to the main frame structure being brought to the non-operating position thereof for elastically biasing the document discharging roller to the non-operating position thereof.

21. The device of claim 20 including means responsive to the main frame structure being at the operating position thereof for confining one end of the separating spring member to the top of the housing of the electrostatic copying apparatus to prevent the elastic biasing action of the separating spring member from being transmitted to the document discharging roller and responsive to the main frame structure being held at the non-operating position thereof for releasing said one end of the separating spring member from the top surface of the housing of the copying apparatus and allowing the elastic biasing action of the separating spring member to be transmitted to the document discharging roller to cause the document discharging roller to be elastically biased to the non-operating position thereof against the elastic biasing action of the pressing spring member.

22. The device of claim 14 wherein said defining means includes a lower guide plate and an upper guide plate located opposite to each other in the vertical direction for defining the introducing section of the document conveying passage; means mounting at least the downstream portion of the upper guide plate for free turning between an operating position at which the upper and lower guide plates define said introducing section therebetween, and a non-operating position at which said introducing section is opened; and a closure member located above at least the downstream portion of the upper guide plate and mounted on said stationary support frame member for opening and closing thereof such that when the closure member is moved in the opening direction, at least the downstream portion of the upper guide plate is turned toward said non-operating position thereof in interlocking relationship with the closure member.

23. The device of claim 22 including means for holding the free end of the closure member in engagement with the top side of the main frame structure such that when the main frame structure is brought from the operating position thereof to the non-operating position thereof, the movement of the main frame structure is transmitted to the closure member to move the closure member in the opening direction thereof and to turn at least the downstream portion of the upper guide plate toward the non-operating position thereof in interlocking relationship with the opening movement of the closure member.

* * * * *